United States Patent
Aiba et al.

(10) Patent No.: US 6,214,738 B1
(45) Date of Patent: Apr. 10, 2001

(54) METHOD FOR PRODUCING NARROW PORES AND STRUCTURE HAVING THE NARROW PORES, AND NARROW PORES AND STRUCTURE PRODUCED BY THE METHOD

(75) Inventors: Toshiaki Aiba, Fujisawa; Hidetoshi Nojiri, Hadano; Taiko Motoi, Atsugi; Tohru Den, Tokyo; Tatsuya Iwasaki, Machida, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,910

(22) Filed: Dec. 20, 1999

(30) Foreign Application Priority Data

| Dec. 25, 1998 | (JP) | 10-368737 |
| Feb. 25, 1999 | (JP) | 11-047539 |
| Jul. 30, 1999 | (JP) | 11-216870 |
| Jul. 30, 1999 | (JP) | 11-216886 |
| Dec. 3, 1999 | (JP) | 11-344134 |

(51) Int. Cl.[7] ............... H01L 21/302; H01L 21/461
(52) U.S. Cl. ............... 438/707; 438/717; 438/720
(58) Field of Search ............... 438/473, 514, 438/527, 676, 688, 746, 707, 708, 710, 716, 717, 720, 725, 698

(56) References Cited

U.S. PATENT DOCUMENTS

| 5,641,591 | * | 6/1997 | Kawakami et al. | 428/218 |
| 5,696,386 | * | 12/1997 | Yamazaki | 257/506 |
| 5,904,509 | * | 5/1999 | Zhang et al. | 438/154 |
| 5,962,872 | * | 10/1999 | Zhang et al. | 257/66 |

FOREIGN PATENT DOCUMENTS

| 0931859A1 | 7/1999 | (EP) . |
| 10-121292 | 5/1998 | (JP) . |

OTHER PUBLICATIONS

R. C. Furneauz et al., "The Formation of Controlled–Porosity Membranes From Anodically Oxidized Aluminum," 337 *Nature* 147 (1989).

Hideki Masuda & Masahiro Satoh, "Fabrication of Gold Nanodot Array Using Anodic Porous Alumina as an Evaporation Mask," 35 *Jpn. J. App. Phys.* 126, 126–129 (1996).

Hideki Masuda, "Kotaibutsuri," 31 *Solid State Phys.* 493 (1996).

Schmuki, P. et al. "Direct Micropatterning of Si and GaAs using electrochemical development of focused ion beam implants," 73 *Applied Physics Letters*, 2500 (1998).

* cited by examiner

*Primary Examiner*—Matthew Smith
*Assistant Examiner*—Calvin Lee
(74) *Attorney, Agent, or Firm*—Fitzpatrick, Cella, Harper & Scinto

(57) ABSTRACT

Provided is a method for producing regularly ordered narrow pores excellent in linearity, and a structure with such narrow pores. A method for producing a narrow pore comprises a step of radiating a particle beam onto a workpiece, and a step of carrying out anodic oxidation of the workpiece having been irradiated with the particle beam, to form a narrow pore in the workpiece.

16 Claims, 11 Drawing Sheets

2: POINT OF STARTING NARROW PORE FORMATION
31: DOT POSITION

31: DOT POSITION

2: POINT OF STARTING NARROW PORE FORMATION
33: INTERSECTION OF LINES
32: LINE POSITION

32: LINE POSITION
33: INTERSECTION OF LINES
2: POINT OF STARTING NARROW PORE FORMATION

METHOD FOR PRODUCING NARROW PORES AND STRUCTURE HAVING THE NARROW PORES, AND NARROW PORES AND STRUCTURE PRODUCED BY THE METHOD

BACKGROUND OF THE INVENTION

1. Field of the Invention

The present invention relates to a method for producing a nanostructure, and, more particularly, to a method for producing a nanostructure with narrow pores, which can be utilized in a wide range of applications to functional materials, structural materials, etc., for electron devices, optical devices, microdevices or the like, and the nanostructure.

2. Related Background Art

Thin films, narrow wires, dots, and so on of metals and semiconductors, when constructed in the size smaller than a certain characteristic length, sometimes demonstrate peculiar, electrical, optical, and/or chemical properties because of confinement of electrons. From this viewpoint, attention is being drawn to materials having the structure finer than several hundred nm (nanostructures) as functional materials.

Methods for producing such nanostructures are, for example, methods for directly producing the nanostructures by semiconductor producing techniques including the fine pattern forming technologies such as the photolithography, electron beam exposure, X-ray exposure, and so on.

In addition to the above production methods, there are attempts to realize novel nanostructures on the basis of ordered structures formed naturally, i.e., structures formed in a self-ordering manner. Many studies have been started on these techniques because they have the potential capability of producing finer structures than by the conventional methods, depending upon the microstructure used as a basis.

An example of such self-ordering techniques is anodic oxidation which permits the nanostructure with narrow pores of the nanometer size to be produced readily and with good controllability. A known example is anodized alumina produced by anodizing aluminum and an alloy thereof in an acid bath.

When an Al sheet is anodized in an acid electrolyte, a porous oxide film is formed (for example, see R. C. Furneaux, W. R. Rigby & A. P. Davids, "NATURE," Vol. 337, P147 (1989) etc.). A feature of this porous oxide film is the peculiar, geometrical structure in which extremely fine, cylindrical holes (nanoholes) having the diameters of several nm to several hundred nm are arranged in parallel at the spacing (cell size) of several nm to several hundred nm. These cylindrical holes have high aspect ratios and are also excellent in uniformity of sectional sizes. The diameter and spacing of the narrow pores can be controlled to some extent by adjusting current and/or voltage during the anodic oxidation, and the thickness of the oxide film and the depth of the narrow pores can be controlled by controlling the time of the anodic oxidation.

In order to improve vertical, linear, and independence characteristics of the narrow pores, there was a proposal of a method of carrying out the anodic oxidation in two stages, i.e., methods of producing the narrow pores by once removing the porous oxide film formed by the anodic oxidation and thereafter carrying out the anodic oxidation again ("Jpn. Journal of Applied Physics," Vol. 35, Part 2, No. 1B, pp.L126–L129, issued Jan. 15, 1996). This method makes use of the fact that pits formed in the surface of the aluminum sheet after the anodized film by the first anodic oxidation is removed, serve as starting points for formation of narrow pores by the second anodic oxidation.

Further, in order to improve the shape and spacing of the narrow pores and the controllability of the pattern, there was also a proposal of a method of forming the fine-hole-formation starting points by use of a stamper, i.e., a method of producing the narrow pores with better shape, spacing, and controllability of pattern by forming depressions as fine-hole-formation starting points while urging a substrate with a plurality of projections in the surface against the surface of the aluminum sheet, and thereafter carrying out the anodic oxidation (Japanese Patent Application Laid-Open No. 10-121292).

There have been attempts of various applications, noting this peculiar, geometrical structure of anodized alumina. Masuda explains them in detail. Application examples thereof will be described below. For example, there are applications to films making use of wear resistance and electric insulation of the anodized films and applications to filters using peeled off films. Further, there were attempts of various applications including coloring, magnetic recording media, EL light-emitting devices, electrochromic devices, optical devices, solar cells, gas sensors, and so on, by using the technology of filling the nanoholes with metal or a semiconductor or the like and the replica technology of nanoholes. In addition, the technologies are expected to be applied in many fields including quantum effect devices such as quantum wires, MIM devices, and the like, molecular sensors using the nanoholes as chemical reaction fields, and so on (Masuda "KOTAIBUTSURI" (Solid State Physics), 31, 493 (1996)).

SUMMARY OF THE INVENTION

A method for producing a narrow pore according to the present invention comprises a step of radiating a particle beam onto a workpiece, and a step of carrying out anodic oxidation of the workpiece thus having been irradiated with the particle beam, to form a narrow pore in the workpiece.

The present invention is also characterized in that the particle beam is a charged particle beam.

The present invention is also characterized in that the particle beam is a focused ion beam or an electron beam.

The present invention is also characterized in that the step of radiating the particle beam is a step of radiating the particle beam onto a film for restraining the anodic oxidation, which is laid on a surface of the workpiece, to selectively remove the film.

The present invention is also characterized in that the step of radiating the particle beam is a step of selectively forming a film for restraining the anodic oxidation, on a surface of the workpiece from a raw material present in an atmosphere surrounding the workpiece.

According to the present invention, the fine-hole-formation starting points can be formed at desired positions by radiating the particle beam onto the workpiece, so that the narrow pores can be formed at the positions of the aforementioned fine-hole-formation starting points by the anodic oxidation of the workpiece. Therefore, the present invention permits the control of the arrangement, spacing, position, direction, etc. of the narrow pores in the structure of the nanometer scale.

Since the production method of the present invention employs the radiation of the particle beam for the formation of the fine-hole-formation starting points, it can readily form the fine-hole-formation starting points with high uniformity even in a workpiece with unevenness in the surface.

Since the production method of the present invention employs the radiation of the particle beam for the formation of the fine-hole-formation starting points, no pressure has to be exerted on the workpiece during the formation of the fine-hole-formation starting points. Therefore, the method of the present invention can also be applied to workpieces of low mechanical strength.

Further, since the production method of the present invention employs a particle beam radiating apparatus with the particle beam such as the focused ion beam, electron beam or the like, the fine-hole-formation starting points can be formed by direct patterning. Therefore, the production method of the present invention does not have to include a step necessitating labor and time, such as application of resist, electron beam exposure, and removal of resist necessary for the production of stamper etc., and can form the fine-hole-formation starting points in a short time.

DETAILED DESCRIPTION OF THE PREFERRED EMBODIMENTS

Figure 1A:
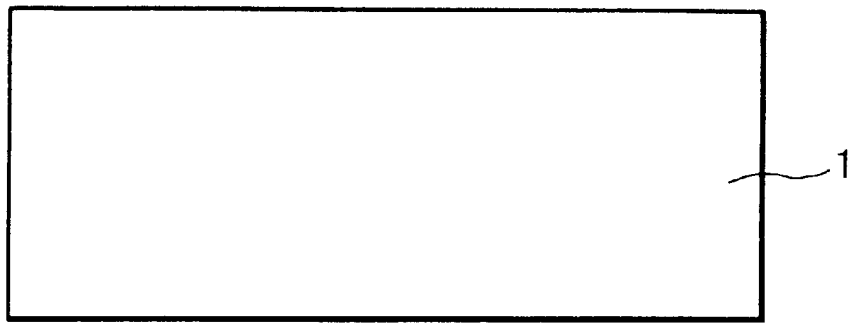
FIGS. 1A, 1B, and 1C are step diagrams to show an example of the production method of nanostructure according to the present invention.

The aforementioned direct production methods of nanostructures and narrow pores by the semiconductor producing techniques had problems of poor yield and high cost of apparatus, and there were, therefore, desires for a method that can produce them with good repeatability by a simple technique.

From this viewpoint, the technique of anodic oxidation is preferable, because the nanostructures and narrow pores can be produced with good controllability relatively easily.

Many technologies for controlling the shape and pattern of the narrow pores have been developed heretofore as to the narrow pores produced by only the normal anodic oxidation, but there was a limit to the control thereof. It is known with regard to the control in the anodic oxidation that the spacing of the narrow pores can be controlled to some extent by anodic oxidation voltage, the depth of the narrow pores by the time, and the diameter of the narrow pores by a pore widening operation. Further, it is also reported as an example of the control of arrangement of the narrow pores by Masuda et al. that ordered nanoholes arrayed in a honeycomb pattern were produced by carrying out the anodic oxidation under appropriate anodic oxidation conditions. The ordered nanoholes by this method, however, had problems that there was a limit to the spacing of producible narrow pores and that the anodic oxidation had to be carried on for a long time.

The method of carrying out the two stages of anodic oxidation improved the vertical, linear, and independence characteristics of narrow pores and locally formed portions with good spacing of narrow pores and good controllability of pattern, but the spacing and pattern of narrow pores were not always constant as a whole, thus posing the problem that the controllability thereof was not good.

Further, the method of forming the fine-hole-formation starting points by use of the stamper improved the shape and spacing of narrow pores and the controllability of pattern on one hand, but had the problems described below on the other hand.

(1) Since the stamper is used, it is difficult to uniformly form the fine-hole-formation starting points in a workpiece with unevenness in the surface.

(2) Since pressure has to be exerted on the workpiece during use of the stamper, it is difficult to apply this method to workpieces of low mechanical strength because of the risk of breaking the workpieces.

(3) Because of the use of compression by the stamper, in the case of workpieces in which a film is formed on an aluminum surface, it is difficult to expose aluminum in the surface and thus difficult to use stamped positions as fine-hole-formation starting points.

(4) Since a hydraulic press has to be used during the use of the stamper, it is not easy to determine the position of the pattern with high accuracy.

(5) Since the microproducing technology requiring labor and time, such as the electron beam lithography, has to be used for the production of the stamper, it is not easy to produce the stamper with uniform projections in high density, without defects, and in a short time.

An object of the present invention is to solve these problems.

Specifically, an object of the present invention is to provide the technology of controlling the shape, spacing, pattern, position, direction, etc. of the narrow pores in the case of the narrow pores and the structure with narrow pores produced by the anodic oxidation.

Another object of the present invention is to provide the technology that can produce the narrow pores and the structure with narrow pores readily and within a short time without constraints on the form of the workpiece, for example such as surface roughness, mechanical strength, existence of a film on the surface, or the like, while permitting high-precision control of the pattern position.

A further object of the present invention is to disclose novel nanostructures and nanostructure devices on the basis of the nanostructure with narrow pores produced by applying the technology and enable the nanoholes to be used as functional materials in a variety of fields.

A method for producing the narrow pores and the structure with narrow pores according to the present invention will be described mainly referring to FIGS. 1A to 1C or FIGS. 9A to 9C. The following steps (a) to (c) mainly correspond to FIGS. 1A to 1C or FIGS. 9A to 9C.

(a) Preparation of workpiece

First prepared is a workpiece 1 in which narrow pores are to be formed.

Workpieces to which the present invention can be applied preferably include members containing the principal component of Al, but there are no specific restrictions on the materials as long as the narrow pores can be formed in the materials by the anodic oxidation.

FIGS. 3A to 3D show examples of forms of workpieces to which the present invention can be preferably applied.

Figure 3A:
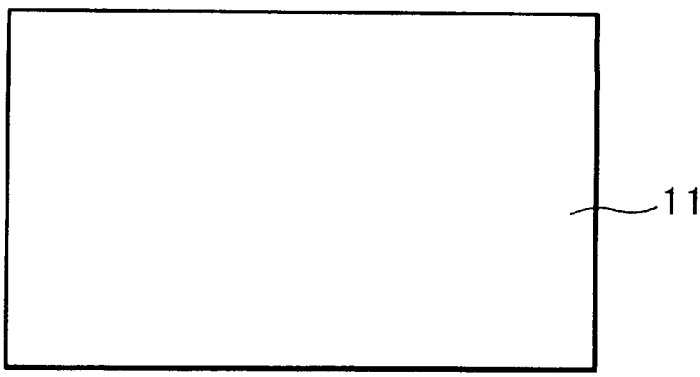
FIGS. 3A, 3B, 3C, and 3D are explanatory diagrams to show examples of forms of the workpieces in the present invention.

The first example of the form is a bulk 11 containing Al as a principal component as illustrated in FIG. 3A. The bulk 11 containing the principal component of Al does not always have to be processed by mirror polishing in order to provide the surface with smoothness, and the present invention can also be applied to the bulk with the surface having some unevenness.

Figure 3B:
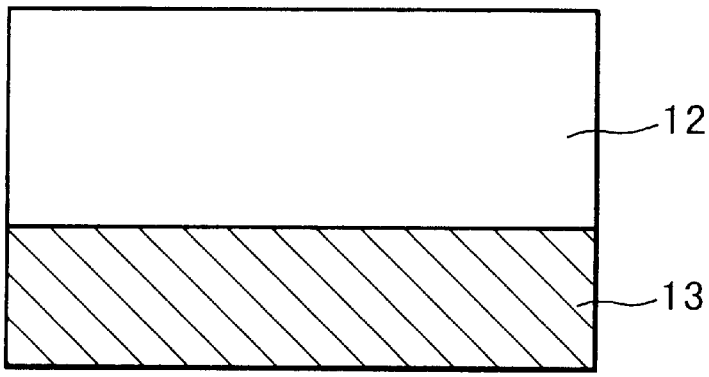

The next example of the second form is a workpiece in which a film 12 containing Al as a principal component is formed on a substrate 13, as illustrated in FIG. 3B. In this case, the substrate 13 can be an insulating substrate of quartz glass or the like, a substrate such as a semiconductor substrate of silicon, gallium arsenic, or the like, or one in which a film of one layer or films of two or more layers are formed on these substrates. There are, however, no specific restrictions on the materials, the thickness, the mechanical strength, etc. of the substrate 13 as long as there is no inconvenience against the formation of narrow pores by the anodic oxidation of the film 12 containing Al as a principal component. For example, when the substrate 13 is one in which a film of Ti, Nb, or the like is formed as a fine-hole-formation terminating member on a substrate, the uniformity can be enhanced for the depth of narrow pores. A method for forming the film 12 containing Al as a principal component can be any film forming method, including resistance heating evaporation, EB evaporation, sputtering, CVD, and so on. The present invention can also be applied to cases in which the film 12 containing Al as a principal component has surface unevenness due to existence of grains or the like.

Figure 3C:
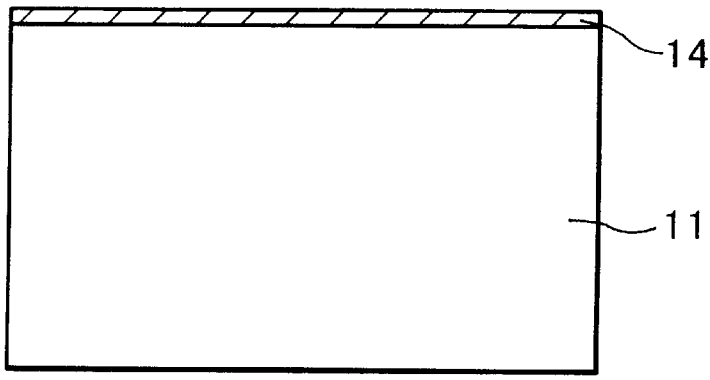
Figure 3D:
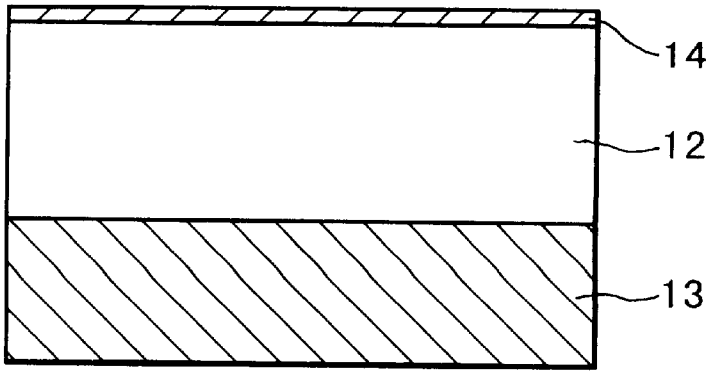
Figure 8A:
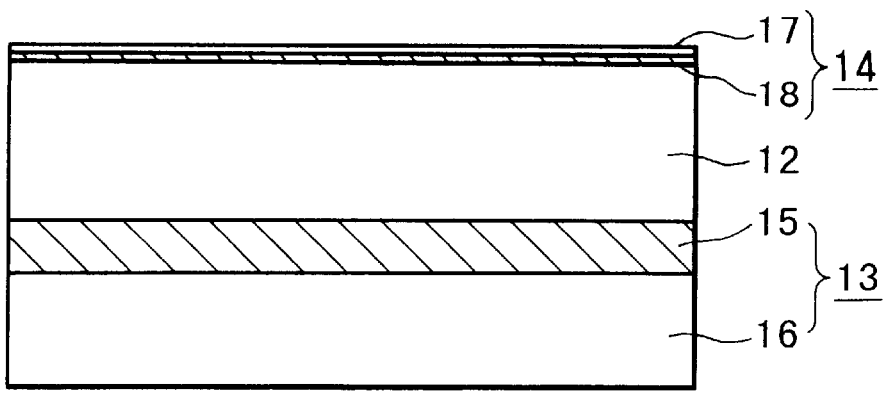
FIGS. 8A, 8B, and 8C are step diagrams to show an example of production of a nanostructure according to the present invention.

The next example of the third form is a workpiece in which a surface film 14 is formed on the bulk 11 containing Al as a principal component (FIG. 3C) or a workpiece in which a surface film 14 is formed on the member in which the film 12 containing Al as a principal component is formed on the substrate 13 (FIG. 3D). A material for the surface film 14 formed on the surface in these examples can be selected, for example, from insulators, valve metals (Nb, Ti, Ta, Zr, Hf, etc.), C, and so on, but there are no specific restrictions on the materials as long as the materials pose no inconvenience in the formation of narrow pores by the anodic oxidation. The surface film 14 can be not only a film of a single layer but also a film of two or more layers, and there are no specific restrictions on materials of the individual layers, a combination thereof, etc. as long as there occurs no inconvenience in the formation of narrow pores by the anodic oxidation. For example, when the workpiece is one in which the surface film 14 is two-layered films of an insulating film 18 and an electroconductive film 17 formed thereon as illustrated in FIG. 8A, the resulting nanostructure will be as illustrated in FIG. 8C. In that case, the nanostructure thus produced can be applied to micro-electronic devices by making use of the conductive film in the top surface. The present invention can also be applied to workpieces in which the surface layer 14 has the surface unevenness due to the existence of grains or the like.

The shape of the workpieces in the present invention is not limited to smooth sheets, but can be one having a curved surface or one with some unevenness or steps in the surface, or the like. There are, however, no specific restrictions on the shape as long as there is no inconvenience in the formation of narrow pores by the anodic oxidation.

(b) Step of forming narrow-pore-formation starting points

The narrow-pore-formation starting points 2 are formed at desired positions by radiating a particle beam 10 (specifically, a charged particle beam, specific examples of the charged particle beam being a focused ion beam and an electron beam) onto the above workpiece 1.

Setting of radiating positions of the particle beam onto the workpiece can be made readily with high accuracy by use of an observing means attached to a particle beam radiating apparatus.

An example of this observing means is a method of obtaining a scan image by detecting secondary electrons appearing when a sample is scanned with the particle beam such as the focused ion beam or the electron beam. In this method the workpiece is exposed to the particle beam during the observation. However, influence of the exposure to the particle beam during the setting of patterning positions on the workpiece can be substantially negligible if the scan image is formed using the particle beam of sufficiently low current.

A method for shifting the position irradiated with the particle beam can be selected from a method for moving the irradiating position by scanning the particle beam itself or the like, a method for moving the workpiece, a method of combination of the two methods, and so on. Here the method for moving the particle beam itself is rational in terms of apparatus, but there is a limit to a movable range. Therefore, the combined method of the two methods is considered to be suitable for the formation of narrow-pore-formation starting points in a large area and in a high density. As for the method for moving the workpiece, the present invention can also be applied with use of a sample stage permitting high-precision position control.

Examples of methods for forming the narrow-pore-formation starting points by the irradiation with the particle beam according to the present invention will be described below referring to FIGS. 4A to 4D, FIGS. 9A to 9C, FIGS. 10A to 10D, and FIGS. 11A and 11B. FIGS. 4A, 4C, 10A, 10C, and 11A show examples in which the narrow-pore-formation starting points are formed in an approximately honeycomb pattern. FIGS. 4B, 4D, 10B, 10D, and 11B show examples in which the narrow-pore-formation starting points are formed in an approximately square pattern. A variety of examples can also be contemplated in addition to the examples described herein, and there are no specific restrictions as long as there is no inconvenience in the formation of narrow pores by the anodic oxidation.

The forming methods of the narrow-pore-formation starting points by the irradiation with the particle beam according to the present invention can be generally classified under the following three methods.

The first method is a method for physically and/or chemically changing the surface of the workpiece by radiating the particle beam onto the surface of the workpiece.

The second method is a method for radiating the particle beam onto a mask (a film for restraining the anodic oxidation) formed on the surface of the workpiece to remove the mask in part to partially expose the surface of the workpiece and using the exposed portions as the narrow-pore-formation starting points.

Further, the third method is a method for radiating the particle beam onto the surface of the workpiece to form a mask (a film for restraining the anodic oxidation) around positions desired to be the narrow-pore-formation starting points on the surface of the workpiece from a raw material existing in an atmosphere surrounding the workpiece.

First, the first method will be explained.

The first method can be either a method of selectively radiating the particle beam only onto sites desired to be the narrow-pore-formation starting points or a method of also radiating the particle beam onto the portions other than the sites desired to be the narrow-pore-formation starting points and forming the narrow-pore-formation starting points by a difference in the irradiation dose between them.

An example of the above method of selectively radiating the particle beam only onto the sites desired to be the narrow-pore-formation starting points is a method of radiating the particle beam in a dot (circular) shape onto a plurality of areas on the workpiece (FIGS. 4A and 4B), for example. In the method illustrated in FIGS. 4A and 4B, a sequence of keeping the particle beam while staying (irradiating) at a certain dot position 31 and thereafter moving the particle beam to a next dot position 31 to be kept there is carried out repeatedly. This can form the narrow-pore-formation starting points in the areas irradiated with the particle beam. If it is desired to keep the particle beam on during the movement between dots, the influence of the irradiation with the particle beam during the movement between dots can be made substantially negligible if the moving time between dots is much shorter than the staying time at each dot position.

Figure 4A:
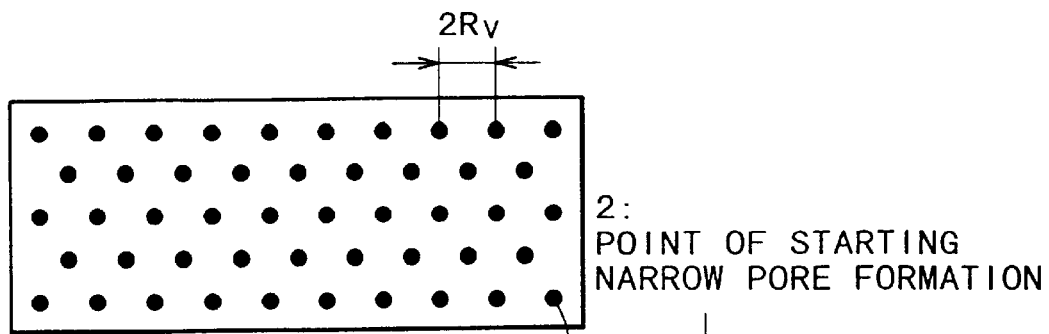
FIGS. 4A, 4B, 4C, and 4D are explanatory diagrams to show examples of the formation of the fine-hole-formation starting points by the particle beam irradiation according to the present invention.
Figure 4B:
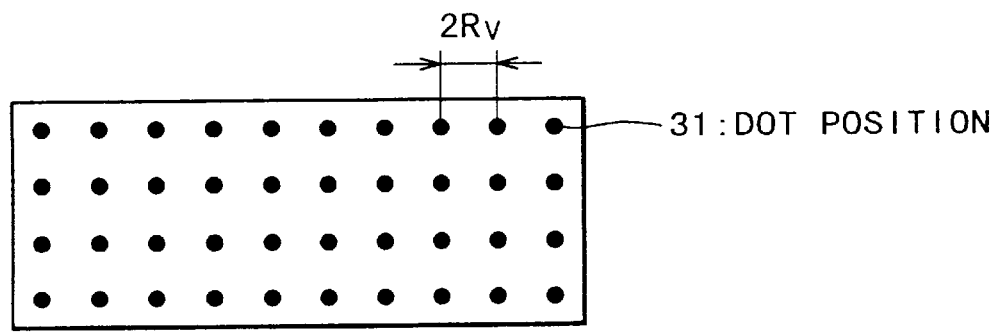
Figure 4C:
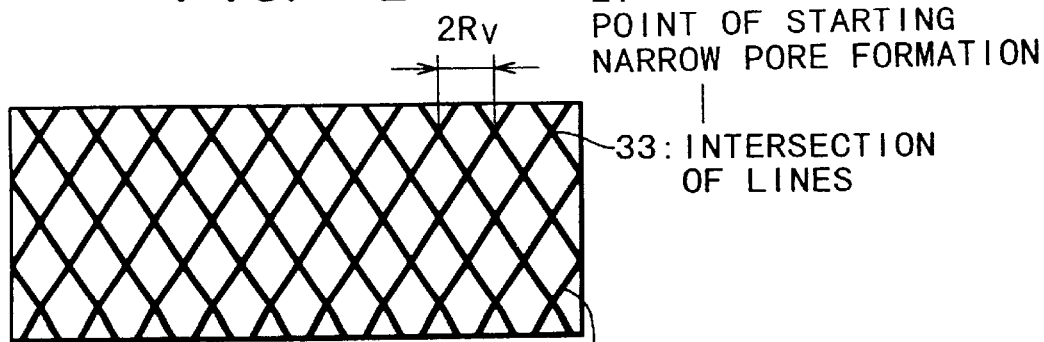
Figure 4D:
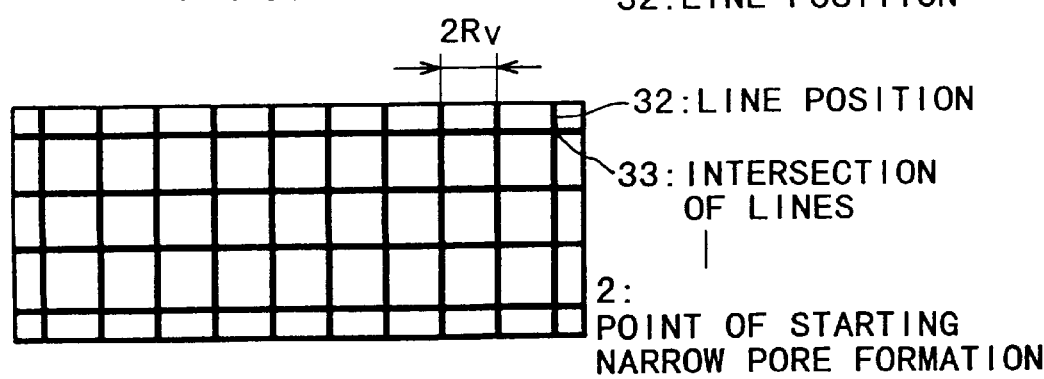

An example of the method of forming the narrow-pore-formation starting points by the difference in the irradiation dose with the particle beam is a method of radiating the particle beam in a line shape onto the workpiece to form intersections (FIGS. 4C and 4D), for example. In this method, the particle beam is radiated in a line pattern in different directions on the workpiece to form portions (intersections) irradiated at least twice, for example. More specifically, for example as illustrated in FIGS. 4C and 4D, the workpiece is scanned in the pattern of the lines 32 in mutually different directions with the particle beam to effect irradiation only once along each line. In this method the intersections 33 between the lines are irradiated multiple times with the particle beam, as compared with the surroundings thereof, and thus the narrow-pore-formation starting points can be formed at the intersections 33 between the lines.

Now described below is the reason why the narrow-pore-formation starting points are formed at the positions irradiated with the particle beam or at the positions irradiated in the greater irradiation dose (the greater number of irradiation times) with the particle beam.

When the particle beam is a focused ion beam, it is assumed that chemical change (composition change or the like) due to ion implantation and/or physical change (formation of a recessed portion) due to ion etching forms a state different from the surroundings in the surface of the workpiece and it serves as a specific point (a narrow-pore-formation starting point) during the anodic oxidation to advance the anodic oxidation.

When the particle beam is an electron beam, it is assumed that physical change (formation of a recessed portion) such as thermal deformation, damage, evaporation, or the like due to the electron beam irradiation and/or chemical change (composition change or the like) forms a state different from the surroundings in the surface of the workpiece and it serves as a specific point (a narrow-pore-formation starting point) during the anodic oxidation to promote the anodic oxidation.

The aforementioned production method is a method using the portions directly subjected to some change in the workpiece by radiating the particle beam to the surface of the workpiece, as the narrow-pore-formation starting points. It is, however, noted that the methods for forming the narrow-pore-formation starting points according to the present invention are not limited to the above method.

Next, the aforementioned second method of the present invention will be described.

Figure 8B:
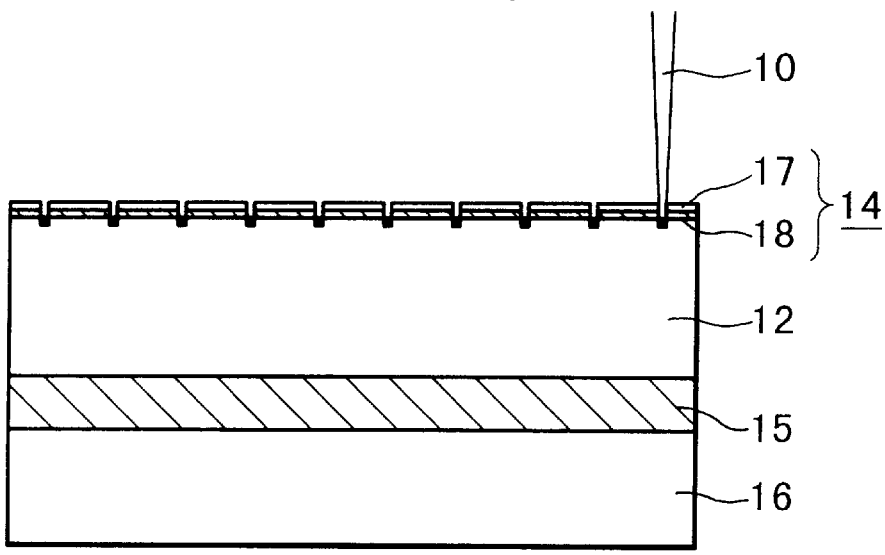
Figure 8C:
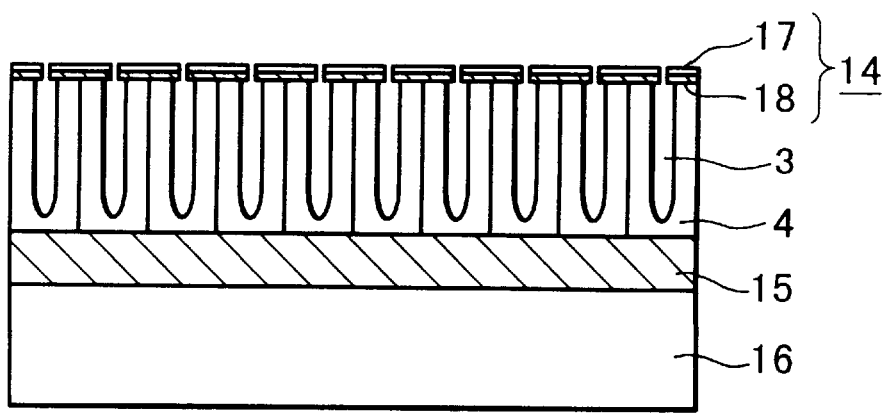
Figure 11A:
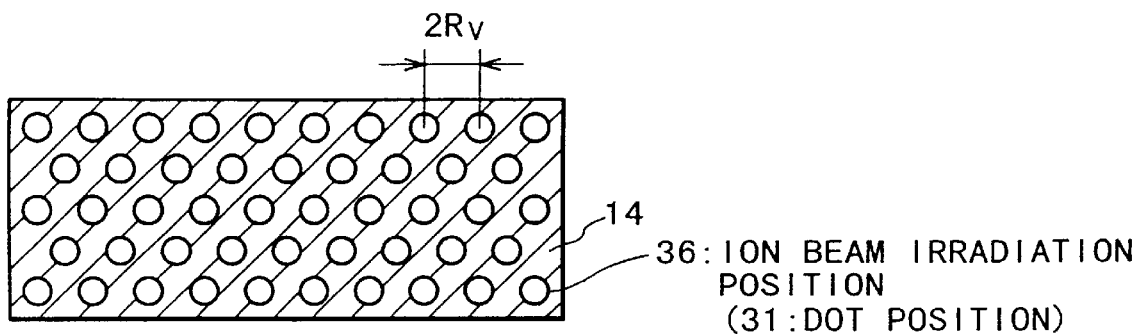
FIGS. 11A and 11B are explanatory diagrams to show an example of the formation of the fine-hole-formation starting points by the particle beam irradiation according to the present invention.
Figure 11B:
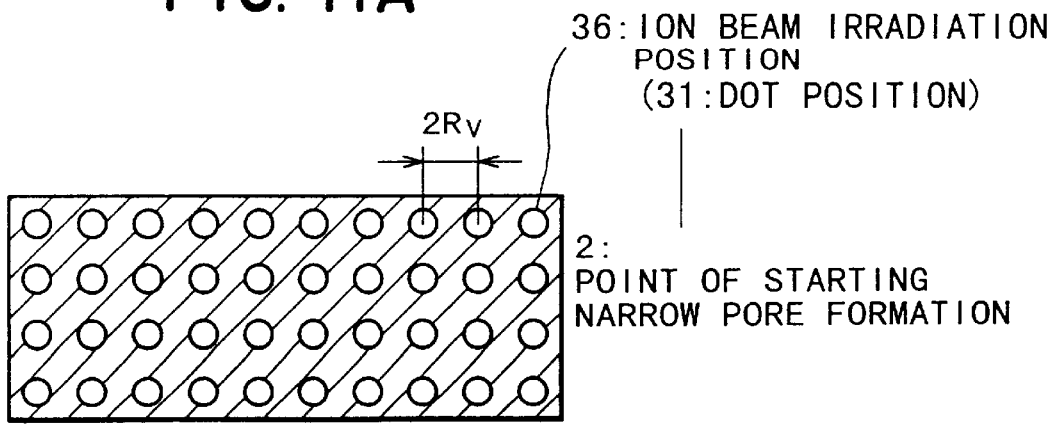

In this method, the film (surface film) 14 for restraining the anodic oxidation is preliminarily laid in the surface of the workpiece, for example as illustrated in FIG. 3C, FIG. 3D, or FIG. 8A, and the particle beam is radiated only onto the desired positions of this film to remove the film in part and expose the surface of the workpiece (FIG. 8B and FIGS. 11A and 11B). In this method, the exposed surfaces of the workpiece serve as the narrow-pore-formation starting points. An example of the above method of radiating the particle beam only onto the sites desired to be the narrow-pore-formation starting points is, for example, the method of radiating the particle beam in the dot (circular) shape onto the workpiece (FIGS. 11A and 11B). The method illustrated in FIGS. 11A and 11B is a method of repeatedly carrying out a process of keeping the particle beam at a certain dot position 31 and thereafter moving it to a next dot position 31 to keep the particle beam thereat. This removes the surface film 14 in the areas irradiated with the particle beam to expose the surface of the workpiece and the exposed areas can be used as the narrow-pore-formation starting points. If the particle beam is desired to be kept on during the movement between dots, the influence of the particle beam irradiation during the movement between dots can be made substantially negligible by setting the moving time between dots to be extremely shorter than the staying time at each dot position.

The aforementioned third method of the present invention will be described below.

Figure 9A:
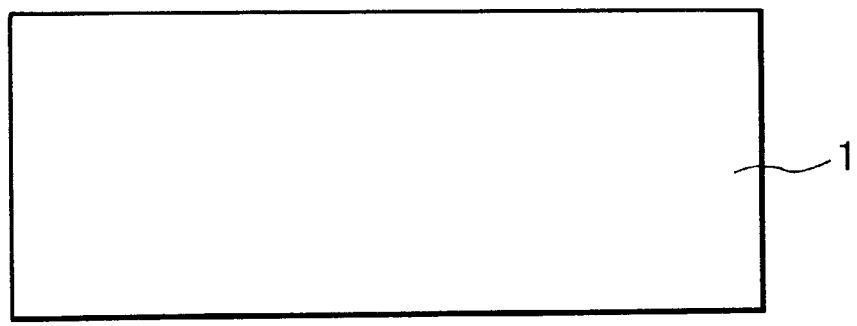
FIGS. 9A, 9B, and 9C are step diagrams to show an example of production of a nanostructure according to the present invention.
Figure 9B:
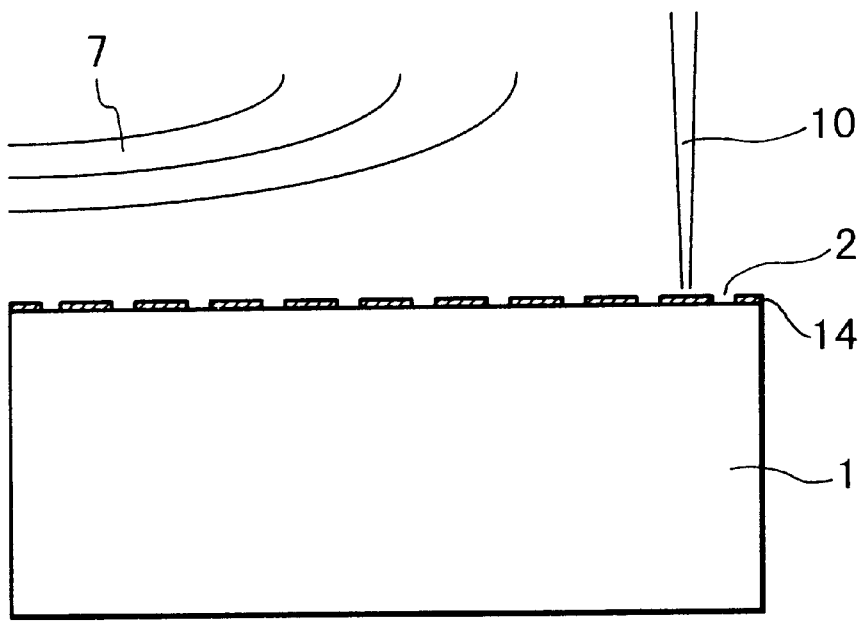

In this method, opposite to the above second method, the particle beam is radiated to desired areas on the workpiece in an atmosphere 7 containing a raw material for formation of the film for restraining the anodic oxidation, as illustrated in FIG. 9B, whereby the aforementioned film 14 for restraining the anodic oxidation can be laid at only the desired positions on the surface of the workpiece. As a result, the surfaces of the workpiece not irradiated with the particle beam (surfaces of the workpiece without formation of the film 14) can serve as the narrow-pore-formation starting points (FIGS. 10A to 10D). An example of the method for forming the narrow-pore-formation starting points according to this method is, for example, a method of radiating the particle beam to the surface 35 of the workpiece except for the pattern expected to be the narrow-pore-formation starting points (the dot (circular) pattern in FIGS. 10A and 10B or the rectangular pattern in FIGS. 10C and 10D) to form the narrow-pore-formation starting points. Particularly, in the case of the patterns illustrated in FIGS. 10C and 10D, the surface of the workpiece is scanned in the line pattern with the particle beam to lay lines of films for restraining the anodic oxidation at intervals, and areas 38 surrounded by the films for restraining the anodic oxidation can serve as the narrow-pore-formation starting points. Therefore, this method is preferable, because the narrow-pore-formation starting points can be formed readily.

The films for restraining the anodic oxidation can be made, for example, of insulators, but they may also be made of conductors or semiconductors if they are materials that can restrain the anodic oxidation of a workpiece. It is, however, preferable to exclude the noble metals if the conductors are used, in order to bring about the anodic oxidation with stability.

Now described below is why the narrow-pore-formation starting points are formed at the non-irradiated positions with the particle beam in the atmosphere containing the raw material for formation of the film for restraining the anodic oxidation. At the positions irradiated with the particle beam, the above raw material is thermally decomposed or the like to form the film on the workpiece at the positions irradiated with the particle beam. It is then assumed that the film thus formed restrains the formation of narrow pore in the workpiece present immediately below the film and thus the formation (growth) of narrow pore takes place at the positions not irradiated with the particle beam.

A first example of the type of the raw material for formation of the film for restraining the anodic oxidation are materials containing a metal as a component. For example, such materials include gases of metal carbonyls such as $W(CO)_6$, $Mo(CO)_6$ and so on, organic metal compounds, metal halides, such as $SiCl_4$, $TiCl_4$, $ZrCl_4$, $TaCl_4$, $MoCl_5$, $WF_6$. and so on, or metal hydrides such as $SiH_4$. $Si_2H_6$, and so on.

A second example of the type of the raw material for formation of the above film for restraining the anodic oxidation are gases of organic compounds containing no metal. Examples of such materials include gases of aromatic compounds such as pyrene, tolunitrile, and so on, hydrocarbons such as methane, ethane, and so on, ketones such as acetone and the like, and so on. It is, however, noted that there are no specific restrictions on the types of the gases for formation of the surface film as long as there is no inconvenience in the formation of narrow pores by the anodic oxidation.

Methods for using the raw material for the formation of the film for restraining the anodic oxidation include use of the raw material alone, use of the raw material mixed with a gas such as Ar, He, $N_2$, or the like, and so on, but the methods are not limited to these methods in particular unless there is inconvenience in the formation of narrow pores by the anodic oxidation.

Further, in cases wherein the raw material used is one of the first example group described above, the film 14 for restraining the anodic oxidation contains a metal. For example, where $W(CO)_6$ is used as a raw material, the film containing W is formed. On the other hand, in cases wherein the raw material used is one of the second example group described above, the film 14 for restraining the anodic oxidation is a film containing carbon. There are, however, some cases wherein these films contain impurities of the other elements present in the atmosphere.

Further, when the particle beam is radiated to the desired areas in the workpiece containing Al as a principal component in the atmosphere 7 containing $Al(CH_3)_3$ or $AlCl_3$ etc. as the above raw material, a substantially uneven Al film is formed on the surface of the workpiece. Therefore, depressed (recessed) portions of the Al film (areas not irradiated with the particle beam or areas irradiated in a smaller irradiation dose with the particle beam) can also be used as the narrow-pore-formation starting points. In this case, we can regard the Al film as the film for restraining the anodic oxidation.

The particle beam used in the present invention will be described below.

When the focused ion beam is used as the particle beam in the present invention, ion species thereof can be selected from liquid metal ion sources such as Ga, Si, Ge, Cs, Nb, Cu, etc., and field ionized gas ion sources such as O, N, H, He, Ar, and so on. There are, however, no specific restrictions on the ion species of the focused ion beam as long as there is no inconvenience in the formation of narrow pores by the anodic oxidation. In practice, Ga is generally used as an ion species of the focused ion beam because it is easy to handle. With consideration to the effect of ion implantation, there are cases in which elements resistant to the anodic oxidation, such as the noble metals or the like, are not preferable as the ion species of the focused ion beam in the present invention. It is, however, noted that this is not the case if they are used for the formation of the film 14 for restraining the anodic oxidation described previously or for the physical deformation of the surface of the workpiece by etching or the like of the surface of the workpiece. Although the effect of ion implantation varies depending upon various process conditions such as the ion species, acceleration voltage, and so on, it is desirable that the element of the ion species not less than 1 ppm be present at the narrow-pore-formation starting points.

On the other hand, when the electron beam is used as the particle beam in the present invention, the energy thereof is preferably not less than 1 keV but less than 10 MeV. The acceleration voltage of electrons is in the range of about several kV to several MV accordingly. There are, however, no specific restrictions on the energy and the acceleration voltage of the electron beam as long as there is no inconvenience in the formation of narrow pores by the anodic oxidation. In practice, however, the energy of the electron beam is preferably not less than 10 keV and not more than 1 MeV for the reason of easiness to handle and the like. Therefore, the acceleration voltage of the electron beam is also preferably not less than 10 kV and not more than 1 MV.

Next described is the placement pattern of the narrow-pore-formation starting points. In the present invention the narrow-pore-formation starting points can be formed at arbitrary positions. There are no specific restrictions on the spacing and pattern of the positions of the narrow-pore-formation starting points. However, with consideration to practical applications, there are cases wherein the narrow pores and the nanostructure with narrow pores are required to be formed at repetitive positions of almost identical spacing and pattern. In such cases the narrow-pore-formation starting points are formed as repetition of almost identical spacing and pattern.

In the formation of narrow pores by the anodic oxidation at this time, where the workpiece is a member containing aluminum as a principal component, the pattern of narrow pores is likely to be a repetition of a nearly honeycomb pattern because of self-organization. It is thus preferable to preliminarily form the narrow-pore-formation starting points as repetition of the nearly honeycomb pattern. This is particularly desirable in cases wherein the structure with deep narrow pores is expected to form. Since the above self-organization does not yet take place in the case of shallow narrow pores, it is also possible to form the narrow-pore-formation starting points as repetition of a pattern of an arbitrary shape such as a nearly square shape or the like, however.

The spacing of the narrow pores in the formation of narrow pores by the anodic oxidation can be controlled to some extent by the various process conditions including the type, concentration, and temperature of an electrolytic solution used in the anodic oxidation, and a voltage applying method, a voltage value, time, etc. of the anodic oxidation. Therefore, it is preferable to preliminarily form the narrow-pore-formation starting points at the spacing of narrow pores expected from the various process conditions. For example, there is the following empirical relationship between the spacing 2R (nm) of the narrow pores and the anodic oxidation voltage Va (Volts).

$$2R=10+2Va \quad (\text{Eq. 1})$$

Therefore, the following condition is preferably satisfied as a condition for the nearest distance (spacing) 2Rv (nm) of the narrow-pore-formation starting points and the anodic oxidation voltage Va (Volts).

$$Va=(2Rv-10)/2 \quad (\text{Eq. 2})$$

Particularly, it is preferable to apply the condition satisfying Eq. 2 within the range of ±30% of Eq. 2.

This is particularly desirable in cases wherein deep narrow pores and a structure with deep narrow pores are to be formed. On the other hand, in cases where the depth of the narrow pores in the workpiece to be formed is shallow, the constraints specified from the above condition etc. concerning the spacing of the narrow-pore-formation starting points become gentler.

There are no specific restrictions on the spacing (2Rv) of the narrow-pore-formation starting points according to the present invention as described above, but the spacing is preferably not less than 5 nm and not more than 1000 nm in consideration of practical applications.

An intensity distribution of the aforementioned particle beam that can be used in the present invention is approximately a Gaussian distribution. It is thus desirable that a particle-beam-irradiated area (i.e., the diameter of the particle beam) of each narrow-pore-formation starting point not overlap with another particle-beam-irradiated area (i.e., the diameter of the particle beam) of a next narrow-pore-formation starting point. The diameter of the particle beam used for radiating in the present invention is preferably not more than the spacing of the narrow-pore-formation starting points. Therefore, the diameter of the particle beam used for the working is preferably not more than 500 nm.

(c) Step of forming narrow pores

The anodic oxidation operation is carried out on the workpiece 1 in which the above narrow-pore-formation starting points were formed, thereby producing the structure having the narrow pores 3 at the narrow-pore-formation starting points 2.

Figure 5:
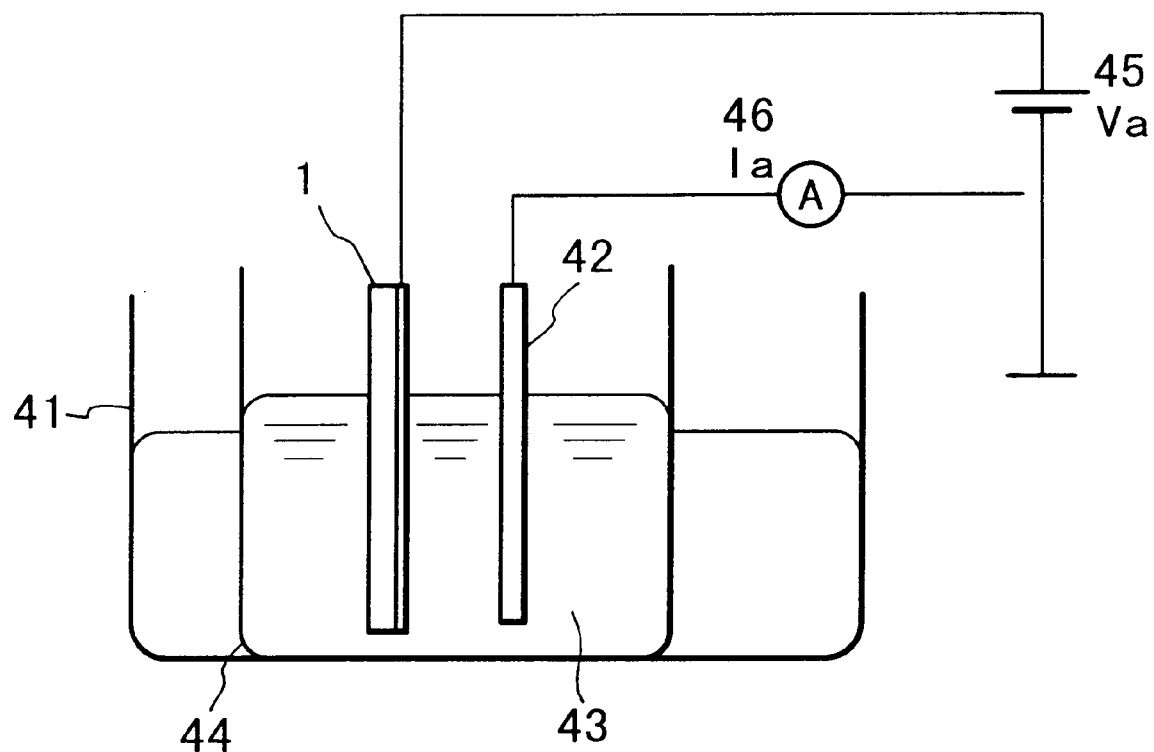
FIG. 5 is a schematic diagram to show an anodic oxidation apparatus.

FIG. 5 is a schematic diagram of an anodic oxidation apparatus used in this step.

In FIG. 5, reference numeral 1 designates the workpiece, 41 a thermostatic water bath, 42 a cathode of a Pt sheet, 43 the electrolytic solution, 44 a reaction vessel, 45 a power supply for applying the anodic oxidation voltage, and 46 a current meter for measuring the anodic oxidation current.

The apparatus also incorporates a computer etc. for automatic control and measurement of voltage and current in addition to the aforementioned elements, though it is omitted from the illustration.

The workpiece 1 and cathode 42 are placed in the electrolytic solution kept at a fixed temperature by the thermostatic water bath and the anodic oxidation is started with application of the voltage between the workpiece and the cathode from the power supply.

The electrolytic solution used in the anodic oxidation is, for example, a solution of oxalic acid, phosphoric acid, sulfuric acid, chromic acid, or the like, but there are no specific restrictions on the electrolytic solution unless there is inconvenience in the formation of narrow pores by the anodic oxidation. The various conditions including the anodic oxidation voltage, temperature, etc. according to each electrolytic solution can be properly set according to the nanostructure produced.

Further, the size of the narrow pores can be widened, if necessary, by the pore widening operation in which the above nanostructure is immersed in an acid solution (for example, a phosphoric acid solution in the case of anodized alumina). The structure with the narrow pores in the desired size can be formed by controlling the concentration of the acid, the operation time, the temperature, and so on.

<Configuration of structure>

Figure 2A:
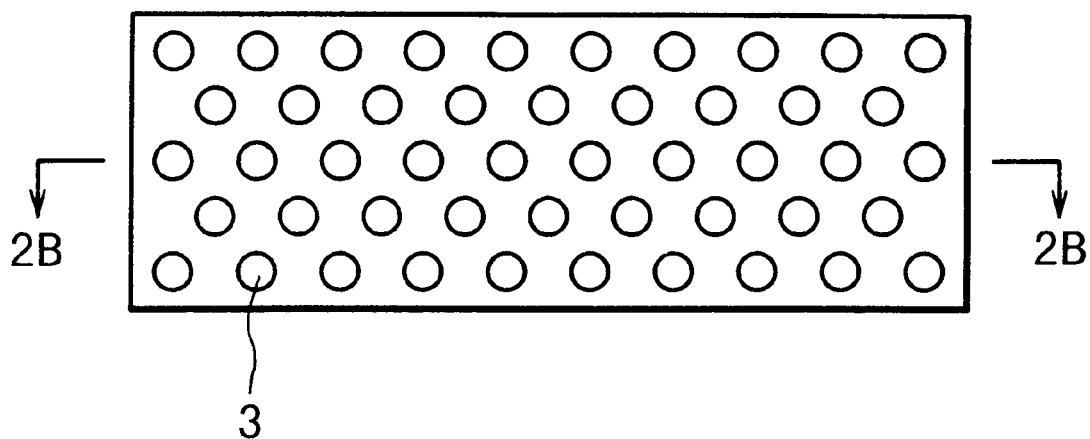
FIGS. 2A and 2B are schematic diagrams to show an example of the nanostructure according to the present invention.
Figure 2B:
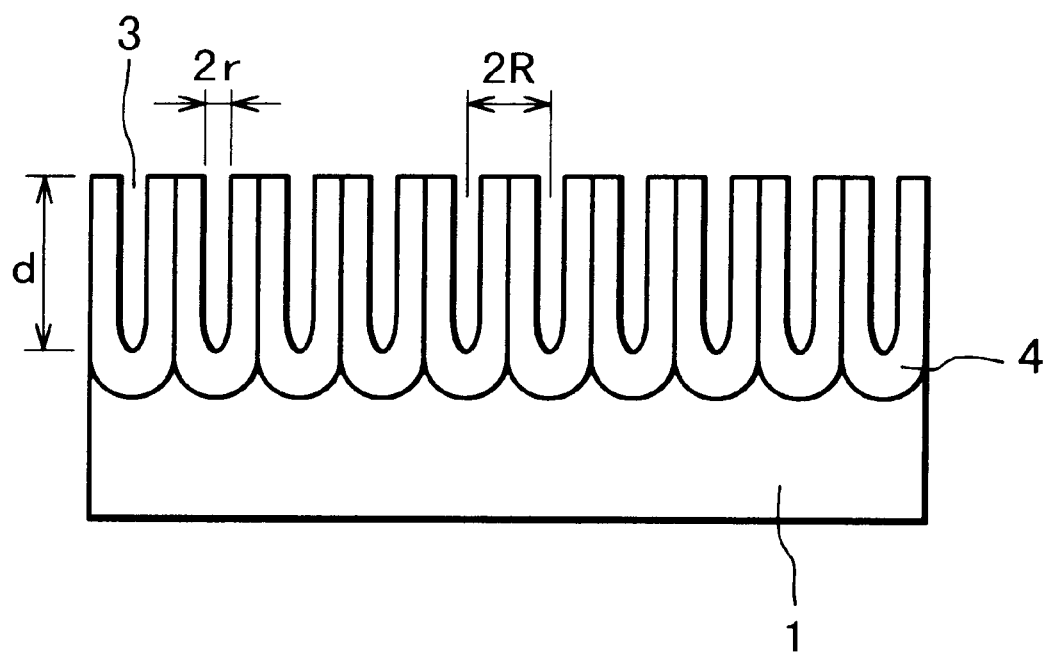

FIGS. 2A and 2B show an example (anodized alumina) of a configuration of the structure having the narrow pores according to the present invention. FIG. 2A is a plan view and FIG. 2B is a sectional view along a line 2B—2B of FIG. 2A.

In FIGS. 2A and 2B, numeral 1 designates the workpiece, 3 the narrow pores (nanoholes), and 4 a barrier layer.

The structure of the present invention will be described below. This structure has the cylindrical narrow pores 3 and the narrow pores 3 are placed in parallel to each other and at nearly equal spacing. The diameter 2r of the narrow pores 3 is several nm to several hundred nm, the spacing (cell size) 2R is about several nm to several hundred nm, and the depth is 10 nm to 100 $\mu$m. The spacing and the diameter of the narrow pores 3 can be controlled to some extent by the formation conditions of the narrow-pore-formation starting points and the various process conditions including the concentration and temperature of the electrolytic solution used in the anodic oxidation, the anodic oxidation voltage applying method, the voltage value, and the time, the conditions of the pore widening operation thereafter, and so on. The depth (length) of the narrow pores 3 can be controlled by the anodic oxidation time, the thickness of Al, and so on, and is, for example, in the range of 10 nm to 100 $\mu$m.

Figure 6A:
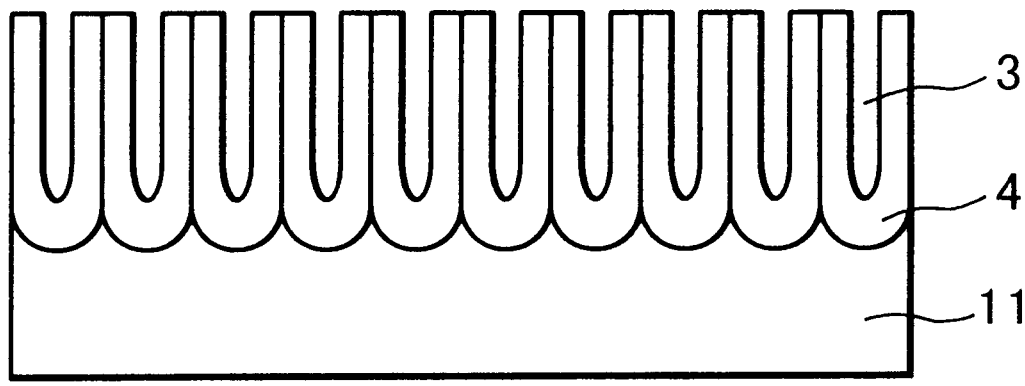
FIGS. 6A, 6B, and 6C are step diagrams to show an example of production of a nanostructure having through holes according to the present invention.
Figure 6B:
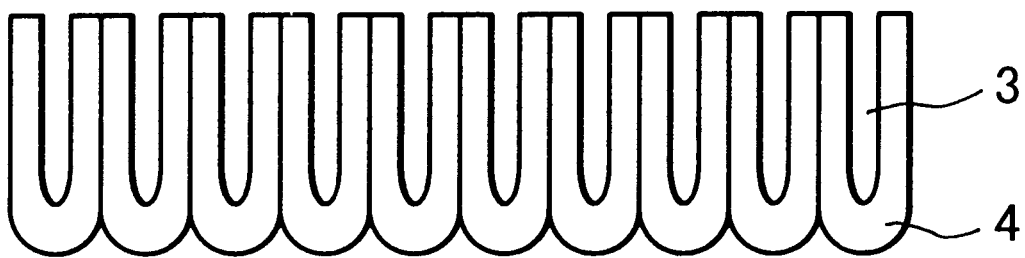
Figure 6C:
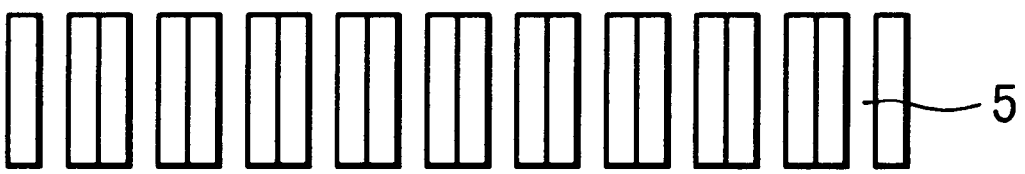

By the production method of the present invention, the structure can be formed in the form wherein the narrow pores are formed up to midway as illustrated in FIG. 2B or can also be formed by having the narrow pores passing through the workpiece, as illustrated in FIG. 6C.

Further, it is also possible to form another nanostructure, using the above structure as a mold or a mask. Examples of such formation of the nanostructure include formation of quantum wires by filling a functional material of a metal, a semiconductor, or the like into the narrow pores by use of the nanostructure having the narrow pores as a mold, formation of quantum dots by evaporation of a functional material of a metal, a semiconductor, or the like by use of the nanostructure having the through narrow pores as a mask for evaporation, and so on, but there are no specific restrictions on the use of the nanostructure as long as there is no inconvenience in the formation of the nanostructure.

Figure 7A:
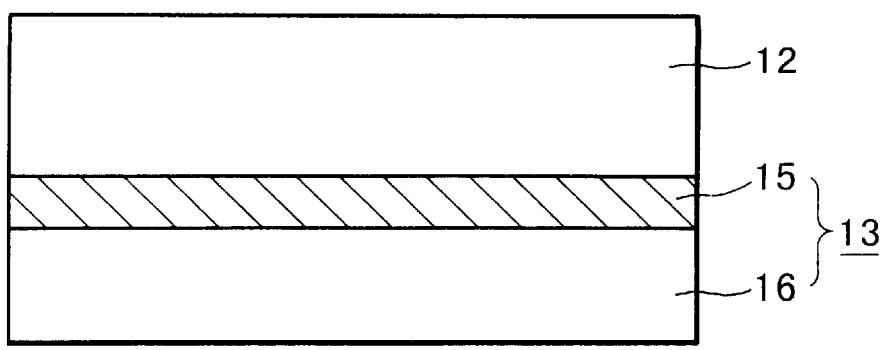
FIGS. 7A, 7B, and 7C are step diagrams to show an example of production of a nanostructure having a filler in the narrow pores according to the present invention.
Figure 7B:
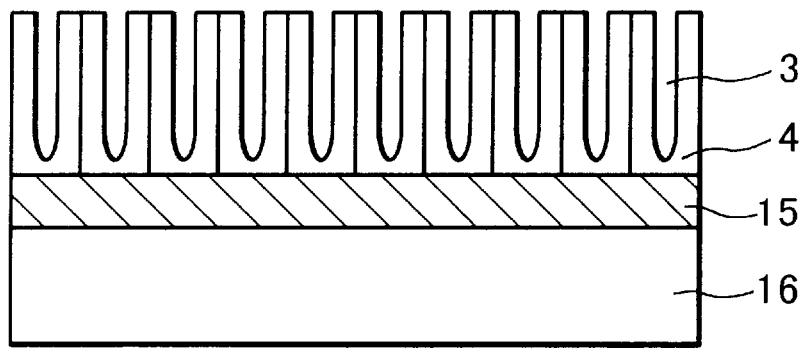
Figure 7C:
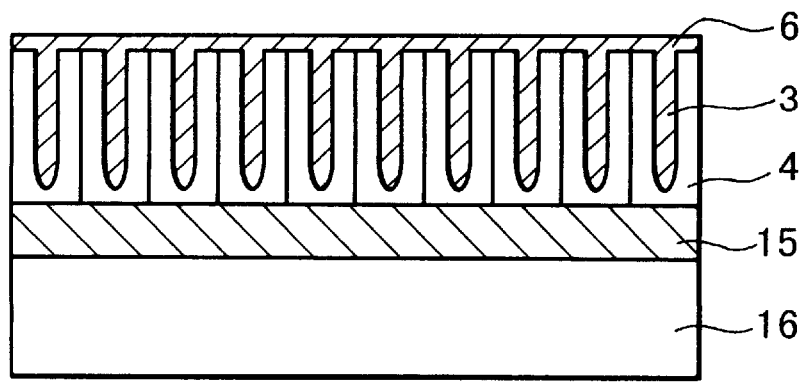

FIG. 7C shows an example of formation of the quantum wires by filling a filler 6 into the narrow pores 3.

The present invention will be described in further detail with examples thereof.

EXAMPLE 1

(a) Preparation of workpiece

As illustrated in FIG. 1A, the workpiece was prepared in the form of a mirror-polished workpiece by electrolytic polishing of the surface of an Al sheet with the purity of 99.99% in a mixed solution of perchloric acid and ethanol.

(b) Step of forming narrow-pore-formation starting points

Figure 1B:
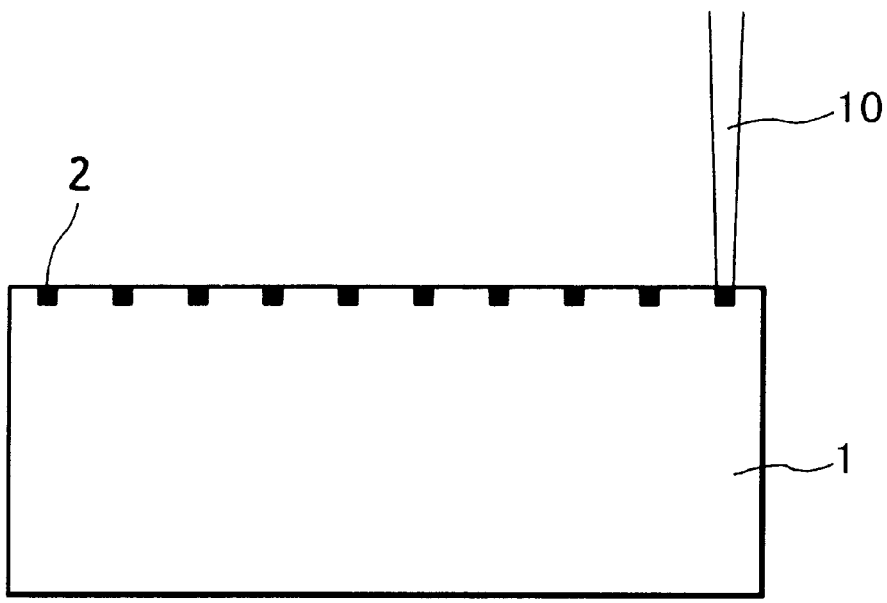

With a focused ion beam irradiation apparatus the focused ion beam was radiated onto the workpiece to form the narrow-pore-formation starting points (recessed portions) in the workpiece as illustrated in FIG. 1B. Here the ion species of the focused ion beam irradiation apparatus was Ga and the acceleration voltage was 30 kV.

First, the positions where the narrow-pore-formation starting points were to be formed were defined using the secondary electron observing function attached to the focused ion beam irradiation apparatus. Then using the focused ion beam having the ion beam diameter of approximately 30 nm and the ion current of approximately 3 pA, the focused ion beam was radiated in the dot shape on the workpiece to achieve the repetition of the nearly honeycomb pattern at the spacing of about 100 nm as illustrated in FIG. 4A, thus forming the narrow-pore-formation starting points. At this time the residence time of the focused ion beam at each dot position was approximately 10 msec.

(c) Step of forming narrow pores

Figure 1C:
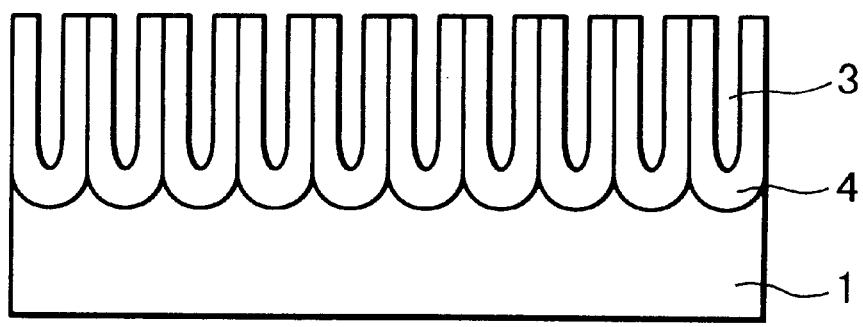

With the anodic oxidation apparatus of FIG. 5 the anodic oxidation operation was carried out on the workpiece to form the workpiece with narrow pores as illustrated in FIG. 1C. The acid electrolytic solution was 0.3M oxalic acid aqueous solution, the solution was kept at 3° C. by the thermostatic water bath, and the anodic oxidation voltage was approximately 40 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM (field emission-scanning electron microscope) and it was confirmed that the diameter of the narrow pores was approximately 50 nm and the spacing of the narrow pores was approximately 100 nm, that the narrow pores were formed as the repetition of the approximately honeycomb pattern, and that the nanostructure was formed with high regularity of the narrow pores.

EXAMPLE 2

(a) Preparation of work

As illustrated in FIG. 3B, the workpiece was prepared in the form in which an Al film approximately 200 nm thick was formed on a quartz substrate by resistance heating evaporation.

(b) Step of forming narrow-pore-formation starting points

With the focused ion beam irradiation apparatus the focused ion beam was radiated onto the workpiece to form the narrow-pore-formation starting points (recessed portions) in the workpiece as illustrated in FIG. 1B. Here the ion species of the focused ion beam irradiation apparatus was Ga and the acceleration voltage was 30 kV. First, the positions where the narrow-pore-formation starting points were to be formed were defined using the secondary electron observing function attached to the focused ion beam irradiation apparatus. Then using the focused ion beam having the ion beam diameter of approximately 30 nm and the ion current of approximately 3 pA, the focused ion beam was radiated in the dot shape on the workpiece so as to achieve the repetition of the nearly square pattern at the spacing of about 60 nm as illustrated in FIG. 4B, thus forming the narrow-pore-formation starting points. At this time the residence time of the focused ion beam at each dot position was approximately 100 msec.

(c) Step of forming narrow pores

With the anodic oxidation apparatus of FIG. 5 the anodic oxidation operation was carried out on the workpiece to form the workpiece with narrow pores as illustrated in FIG. 1C. The acid electrolytic solution was a 0.3M sulfuric acid aqueous solution, the solution was kept at 3° C. by the thermostatic water bath, and the anodic oxidation voltage was approximately 25 V.

After the anodic oxidation operation, the workpiece was then immersed in 5 wt % phosphoric acid solution for 20 minutes to widen the diameter of the narrow pores.

Evaluation (observation of structure)

The workpiece was observed with FE-SEM and it was confirmed that the diameter of the narrow pores was approximately 40 nm and the spacing of the narrow pores was approximately 60 nm, that the narrow pores were formed as the repetition of the approximately square pattern, and that the nanostructure was formed with high regularity of the narrow pores.

EXAMPLE 3

(a) Preparation of workpiece

The workpiece was prepared in the form similar to that in Example 1.

(b) Step of forming narrow-pore-formation starting points

With the focused ion beam irradiation apparatus the focused ion beam was radiated onto the workpiece to form the narrow-pore-formation starting points (recessed portions) in the workpiece as illustrated in FIG. 1B. Here the ion species of the focused ion beam irradiation apparatus was Ga and the acceleration voltage was 30 kV. First, the positions where the narrow-pore-formation starting points were to be formed were defined using the secondary electron observing function attached to the focused ion beam irradiation apparatus. Then using the focused ion beam having the ion beam diameter of approximately 30 nm and the ion current of approximately 3 pA, the narrow-pore-formation starting points were formed at intersections between lines in such a manner that the focused ion beam was radiated in a line pattern to implement the repetition of nearly parallel lines at the spacing of approximately 100 nm and then the focused ion beam was radiated in a line pattern so as to implement the repetition of nearly parallel lines at the spacing of approximately 100 nm in a direction inclined at 60° to the previous lines as illustrated in FIG. 4C. At this time the scan speed and the number of scan times were adjusted so that the total residence time of the focused ion beam at each intersection between lines was approximately 10 msec.

(c) Step of forming narrow pores

With the anodic oxidation apparatus of FIG. 5 the anodic oxidation operation was carried out on the workpiece to form the workpiece with narrow pores as illustrated in FIG.

1C. The acid electrolytic solution was a 0.3M oxalic acid aqueous solution, the solution was kept at 3° C. by the thermostatic water bath, and the anodic oxidation voltage was approximately 50 V.

After the anodic oxidation operation, the workpiece was then immersed in 5 wt % phosphoric acid solution for 30 minutes to widen the diameter of the narrow pores.

Evaluation (observation of structure)

The workpiece was observed with FE-SEM and it was confirmed that the diameter of the narrow pores was approximately 50 nm and the spacing of the narrow pores was approximately 115 nm, that the narrow pores were formed as the repetition of the approximately honeycomb pattern, and that the nanostructure was formed with high regularity of the narrow pores.

EXAMPLE 4

(a) Preparation of workpiece

As shown in FIG. 8A, the workpiece 1 was prepared in such a manner that a substrate 13 was formed by depositing a Ti film, which will be used as a fine-hole terminating member 15 approximately 50 nm thick, on an Si substrate 16 by sputtering, thereafter an Al film 12 approximately 500 nm thick was deposited thereon by resistance heating evaporation, and further a surface film 14 was formed by depositing an $SiO_2$ film approximately 20 nm thick as an insulating film 18 by sputtering and then depositing a Pt film approximately 20 nm thick as a conductive film 17 by sputtering.

(b) Step of forming narrow-pore-formation starting points

With the focused ion beam irradiation apparatus the focused ion beam was radiated onto the workpiece to form the narrow-pore-formation starting points in the workpiece as illustrated in FIG. 8B. Here the ion species of the focused ion beam irradiation apparatus was Ga and the acceleration voltage was 30 kV. First, the positions where the narrow-pore-formation starting points were to be formed were defined using the secondary electron observing function attached to the focused ion beam irradiation apparatus. Then using the focused ion beam having the ion beam diameter of approximately 50 nm and the ion current of approximately 60 pA, the focused ion beam was radiated in the dot shape on the workpiece to achieve the repetition of the nearly honeycomb pattern at the spacing of about 150 nm as illustrated in FIG. 4A, thus forming the narrow-pore-formation starting points (recessed portions). At this time the residence time of the focused ion beam at each dot position was approximately 30 msec.

(c) Step of forming narrow pores

With the anodic oxidation apparatus of FIG. 5 the anodic oxidation operation was carried out on the workpiece to form the workpiece with narrow pores. The acid electrolytic solution was a 0.3M phosphoric acid aqueous solution, the solution was kept at 3° C. by the thermostatic water bath, and the anodic oxidation voltage was approximately 70 V. It was confirmed here by decrease of current that the anodic oxidation proceeded up to the fine-hole terminating member during the anodic oxidation operation.

After the anodic oxidation operation, the workpiece was then immersed in 5 wt % phosphoric acid solution for 30 minutes to widen the diameter of the narrow pores (see FIG. 8C).

Evaluation (observation of structure)

The workpiece was observed with FE-SEM and it was confirmed that the diameter of the narrow pores in the surface film was approximately 50 nm, the diameter of the narrow pores in the alumina film was approximately 70 nm, and the spacing of the narrow pores was approximately 150 nm, that the narrow pores were formed as the repetition of the approximately honeycomb pattern, and that the nanostructure was formed with high regularity of the narrow pores. Electrical measurement of the workpiece was also carried out and it was confirmed that the Pt film in the surface maintained the electrically conductive property and that the electrical insulation was made between the Pt film in the surface and the Ti film as the fine-hole terminating member.

EXAMPLE 5

The present example is an example in which the nanostructure with through narrow pores was produced by removing the portions other than the one having the narrow pores.

(a) Preparation of workpiece; and (b) step of forming narrow-pore-formation starting points By the methods similar to those in (a) and (b) of Example 1, the workpiece was prepared and thereafter the narrow-pore-formation starting points were formed in the workpiece.

(c) Step of forming narrow pores

With the anodic oxidation apparatus of FIG. 5 the anodic oxidation operation was carried out on the workpiece to form the workpiece with narrow pores as illustrated in FIG. 1C. The acid electrolytic solution was a 0.3M oxalic acid aqueous solution, the solution was kept at 3° C. by the thermostatic water bath, and the anodic oxidation voltage was approximately 40 V.

(d) Step of removing the portions other than the one having the narrow pores

The step of removing the other portions than the portion having the narrow pores is illustrated in FIGS. 6A to 6C. First, the nanostructure as illustrated in FIG. 6A was immersed in $HgCl_2$ saturated solution to remove the part of Al bulk 11 of the workpiece (FIG. 6B). Then the workpiece was immersed in 5 wt % phosphoric acid solution for 30 minutes to remove the barrier layer 4 and widen the diameter of the narrow pores, thereby producing the nanostructure having the through narrow pores 5 (FIG. 6C).

Evaluation (observation of structure)

The workpiece was observed with the FE-SEM and it was confirmed that the diameter of the narrow pores was approximately 50 nm and the spacing of the narrow pores was approximately 100 nm, that the through narrow pores were formed as the repetition of the approximately honeycomb pattern, and that the nanostructure was formed with high regularity of the through narrow pores.

EXAMPLE 6

The present example is an example in which the nanostructure (quantum wires) was produced by filling metal in the narrow pores, using the nanostructure with the narrow pores formed by the anodic oxidation, as a mold.

(a) Preparation of workpiece

As illustrated in detail in FIG. 7A, the workpiece 1 was prepared in such a manner that the substrate 13 was formed by depositing a Ti film, which will be used as a fine-hole terminating member approximately 50 nm thick, on an Si substrate 16 by sputtering and thereafter an Al film 12 approximately 500 nm thick was further deposited thereon by resistance heating evaporation.

(b) Step of forming narrow-pore-formation starting points

The narrow-pore-formation starting points were formed in the workpiece by the method similar to that in (b) of Example 1 except that the residence time of the focused ion beam at each dot position was approximately 100 msec.

(c) Step of forming narrow pores

By the method similar to that in (c) of Example 1, the narrow pores were formed in the workpiece and thereafter the diameter of the narrow pores was widened (FIG. 7B). It was confirmed here by decrease of current that the anodic oxidation proceeded up to the fine-hole terminating member during the anodic oxidation operation.

(d) Step of filling metal in the narrow pores

Then Ni metal electrodeposition was carried out to fill the filler 6 in the narrow pores (FIG. 7C). The Ni filling was effected in such a manner that the workpiece, together with the opposed electrode of Ni, was immersed in the electrolytic solution of 0.14M $NiSO_4$ and 0.5M $H_3BO_3$ to bring about electrodeposition to precipitate Ni in the nanoholes.

Evaluation (observation of structure)

The workpiece before the Ni filling was observed with FE-SEM and it was confirmed that the diameter of the narrow pores was approximately 50 nm and the spacing of the narrow pores was approximately 100 nm, that the narrow pores were formed as the repetition of the approximately honeycomb pattern, and that the nanostructure was formed with high regularity of the narrow pores. It was also confirmed that the narrow pores extended up to the fine-hole terminating member and that the length of the narrow pores was controlled by placing the fine-hole terminating member.

Further, the workpiece after the Ni filling was observed with FE-SEM and it was confirmed that the narrow pores were filled with Ni and the quantum wires of Ni were formed in the thickness of about 50 nm.

COMPARATIVE EXAMPLE 1

In Comparative Example 1, the nanostructure was produced by the method similar to that in Example 1 except that (b) the step of forming the narrow-pore-formation starting points in Example 1 was not carried out.

Evaluation (observation of structure)

The workpiece was observed with the FE-SEM and it was confirmed that the diameter of the narrow pores was 30 to 50 nm and the spacing of the narrow pores was 90 to 100 nm, that the narrow pores were formed at random, and that the regularity of the narrow pores was low.

EXAMPLE 7

(a) Preparation of workpiece

As illustrated in FIG. 1A, the workpiece was prepared in the form of a mirror-polished workpiece by electrolytic polishing of the surface of the Al sheet with the purity of 99.99% in the mixed solution of perchloric acid and ethanol.

(b) Step of forming narrow-pore-formation starting points

With an electron beam irradiation apparatus an electron beam was radiated onto the workpiece to form the narrow-pore-formation starting points (recessed portions) in the workpiece as illustrated in FIG. 1B. Here the acceleration voltage of the electron beam irradiation apparatus was 200 kV.

First, the positions where the narrow-pore-formation starting points were to be formed were defined using the secondary electron observing function attached to the electron beam irradiation apparatus. Then using the electron beam having the beam diameter of approximately 10 nm, the electron beam was radiated in the dot shape on the workpiece to achieve the repetition of the nearly honeycomb pattern at the spacing (2Rv) of about 100 nm as illustrated in FIG. 4A, thus forming the narrow-pore-formation starting points.

(c) Step of forming narrow pores

With the anodic oxidation apparatus of FIG. 5 the anodic oxidation operation was carried out on the workpiece to form the workpiece with narrow pores as illustrated in FIG. 1C. The acid electrolytic solution was a 0.3M oxalic acid aqueous solution, the solution was kept at 3° C. by the thermostatic water bath, and the anodic oxidation voltage was approximately 40 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM (field emission-scanning electron microscope) and it was confirmed that the diameter of the narrow pores was approximately 50 nm and the spacing of the narrow pores was approximately 100 nm, that the narrow pores were formed as the repetition of the approximately honeycomb pattern, and that the nanostructure was formed with high regularity of the narrow pores.

EXAMPLE 8

(a) Preparation of workpiece

As illustrated in FIG. 3B, the workpiece was prepared in the form in which the Al film 12 approximately 200 nm thick was formed on the quartz substrate 13 by resistance heating evaporation.

(b) Step of forming narrow-pore-formation starting points

With the electron beam irradiation apparatus the electron beam was radiated onto the workpiece to form the narrow-pore-formation starting points (recessed portions) in the workpiece as illustrated in FIG. 1B. Here the acceleration voltage of the electron beam irradiation apparatus was 200 kV. First, the positions where the narrow-pore-formation starting points (recessed portions) were to be formed were defined using the secondary electron observing function attached to the electron beam irradiation apparatus. Then using the electron beam having the beam diameter of approximately 10 nm, the electron beam was radiated in the dot shape on the workpiece so as to achieve the repetition of the nearly square pattern at the spacing (2Rv) of about 60 nm as illustrated in FIG. 4B, thus forming the narrow-pore-formation starting points (recessed portions).

(c) Step of forming narrow pores

With the anodic oxidation apparatus of FIG. 5 the anodic oxidation operation was carried out on the workpiece to form the workpiece with narrow pores as illustrated in FIG. 1C. The acid electrolytic solution was a 0.3M sulfuric acid aqueous solution, the solution was kept at 3° C. by the thermostatic water bath, and the anodic oxidation voltage was approximately 25 V.

After the anodic oxidation operation, the workpiece was then immersed in 5 wt % phosphoric acid solution for 20 minutes to widen the diameter of the narrow pores.

Evaluation (observation of structure)

The workpiece was observed with the FE-SEM and it was confirmed that the diameter of the narrow pores was approximately 40 nm and the spacing of the narrow pores was approximately 60 nm, that the narrow pores were formed as the repetition of the approximately square pattern, and that the nanostructure was formed with high regularity of the narrow pores.

EXAMPLE 9

(a) Preparation of workpiece

The workpiece was prepared in the form similar to that in Example 7.

(b) Step of forming narrow-pore-formation starting points

With the electron beam irradiation apparatus the electron beam was radiated onto the workpiece to form the narrow-pore-formation starting points (recessed portions) in the workpiece as illustrated in FIG. 1B. Here the acceleration voltage of the electron beam irradiation apparatus was 200 kV. First, the positions where the narrow-pore-formation starting points (recessed portions) were to be formed were defined using the secondary electron observing function attached to the electron beam irradiation apparatus. Then using the electron beam having the beam diameter of approximately 30 nm, the narrow-pore-formation starting points (recessed portions) were formed at intersections between lines in such a manner that the electron beam was radiated in a line pattern to implement the repetition of nearly parallel lines at the spacing of approximately 100 nm and then the electron beam was radiated in a line pattern to implement the repetition of nearly parallel lines at the spacing of approximately 100 nm in a direction inclined at 60° to the previous lines as illustrated in FIG. 4C.

(c) Step of forming narrow pores

With the anodic oxidation apparatus of FIG. 5 the anodic oxidation operation was carried out on the workpiece to form the workpiece with narrow pores as illustrated in FIG. 1C. The acid electrolytic solution was a 0.3M oxalic acid aqueous solution, the solution was kept at 3° C. by the thermostatic water bath, and the anodic oxidation voltage was approximately 50 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM and it was confirmed that the diameter of the narrow pores was approximately 50 nm and the spacing of the narrow pores was approximately 115 nm, that the narrow pores were formed as the repetition of the approximately honeycomb pattern, and that the nanostructure was formed with high regularity of the narrow pores.

EXAMPLE 10

(a) Preparation of workpiece

As shown in detail in FIG. 8A, the workpiece 1 was prepared in such a manner that the substrate 13 was formed by depositing the Ti film, which will be used as a fine-hole terminating member 15 approximately 50 nm thick, on the Si substrate 16 by sputtering, thereafter the Al film 12 approximately 500 nm thick was deposited by resistance heating evaporation, and further the surface film 14 was formed by depositing an $SiO_2$ film approximately 20 nm thick as the insulating film 18 by sputtering and then depositing a Pt film approximately 20 nm thick as the conductive film 17 by sputtering.

(b) Step of forming narrow-pore-formation starting points

With the electron beam irradiation apparatus the electron beam was radiated onto the workpiece to form the narrow-pore-formation starting points (recessed portions) 2 in the workpiece as illustrated in FIG. 8B. Here the acceleration voltage of the electron beam irradiation apparatus was 200 kV. First, the positions where the narrow-pore-formation starting points (recessed portions) were to be formed were defined using the secondary electron observing function attached to the electron beam irradiation apparatus. Then using the electron beam having the beam diameter of approximately 10 nm, the electron beam was radiated in the dot shape on the workpiece so as to achieve the repetition of the nearly honeycomb pattern at the spacing of about 150 nm as illustrated in FIG. 4A, thus forming the narrow-pore-formation starting points (recessed portions).

(c) Step of forming narrow pores

With the anodic oxidation apparatus of FIG. 5 the anodic oxidation operation was carried out on the workpiece to form the workpiece with narrow pores. The acid electrolytic solution was a 0.3M phosphoric acid aqueous solution, the solution was kept at 3° C. by the thermostatic water bath, and the anodic oxidation voltage was approximately 70 V. It was confirmed here by decrease of current that the anodic oxidation proceeded up to the fine-hole terminating member during the anodic oxidation operation.

After the anodic oxidation operation, the workpiece was then immersed in 5 wt % phosphoric acid solution for 30 minutes to widen the diameter of the narrow pores (see FIG. 8C).

Evaluation (observation of structure)

The workpiece was observed with the FE-SEM and it was confirmed that the diameter of the narrow pores in the surface film was approximately 50 nm, the diameter of the narrow pores in the alumina film was approximately 70 nm, and the spacing of the narrow pores was approximately 150 nm, that the narrow pores were formed as the repetition of the approximately honeycomb pattern, and that the nanostructure was formed with high regularity of the narrow pores. Electrical measurement of the workpiece was also carried out and it was confirmed that the Pt film in the surface maintained the electrically conductive property and that the electrical insulation was made between the Pt film in the surface and the Ti film as the fine-hole terminating member.

EXAMPLE 11

The present example is an example in which the structure having the through narrow pores was produced. (a) Preparation of workpiece and (b) step of forming narrow-pore-formation starting points (recessed portions) were carried out using the methods similar to those in (a) and (b) of Example 7.

(c) Step of forming narrow pores

With the anodic oxidation apparatus of FIG. 5 the anodic oxidation operation was carried out on the workpiece to form the workpiece with narrow pores as illustrated in FIG. 1C. The acid electrolytic solution was a 0.3M oxalic acid aqueous solution, the solution was kept at 3° C. by the thermostatic water bath, and the anodic oxidation voltage was approximately 40 V.

(d) Step of removing the other portions than the portion having the narrow pores The step of removing the portions other than the one having the narrow pores is illustrated in FIGS. 6A to 6C. First, the nanostructure as illustrated in FIG. 6A was immersed in $HgCl_2$ saturated solution to remove the part of Al bulk 11 of the workpiece (FIG. 6B). Then the workpiece was immersed in 5 wt % phosphoric acid solution for 30 minutes to remove the barrier layer 4 and widen the diameter of the narrow pores, thereby producing the nanostructure having the through narrow pores 5 (FIG. 6C).

Evaluation (observation of structure)

The workpiece was observed with the FE-SEM and it was confirmed that the diameter of the narrow pores was approximately 50 nm and the spacing of the narrow pores was approximately 100 nm, that the through narrow pores were formed as the repetition of the approximately honeycomb pattern, and the nanostructure was formed with high regularity of the through narrow pores.

EXAMPLE 12

The present example is an example in which the nanostructure (quantum wires) was produced by filling the metal in the narrow pores, using the nanostructure formed by the anodic oxidation, as a mold.

(a) Preparation of workpiece

As illustrated in FIG. 7A, the workpiece 1 was prepared in such a manner that the substrate 13 was formed by depositing a Ti film, which will be used as a fine-hole terminating member approximately 50 nm thick, on the Si substrate 16 by sputtering and thereafter the Al film 12 approximately 500 nm thick was further deposited thereon by resistance heating evaporation.

(b) Step of forming narrow-pore-formation starting points

The narrow-pore-formation starting points (recessed portions) were formed in the workpiece by the method similar to that in (b) of Example 7.

(c) Step of forming narrow pores

By the method similar to that in (c) of Example 7, the narrow pores were formed in the workpiece and thereafter the diameter of the narrow pores was widened (FIG. 7B). It was confirmed here by decrease of current that the anodic oxidation proceeded up to the fine-hole terminating member during the anodic oxidation operation.

(d) Step of filling metal in the narrow pores

Then Ni metal electrodeposition was carried out to fill the filler 6 in the narrow pores (FIG. 7C). The Ni filling was effected in such a manner that the workpiece, together with the opposed electrode of Ni, was immersed in the electrolytic solution of 0.14M $NiSO_4$ and 0.5M $H_3BO_3$ to bring about electrodeposition to precipitate Ni in the nanoholes.

Evaluation (observation of structure)

The workpiece before the Ni filling was observed with the FE-SEM and it was confirmed that the diameter of the narrow pores was approximately 50 nm and the spacing of the narrow pores was approximately 100 nm, that the narrow pores were formed as the repetition of the approximately honeycomb pattern, and that the nanostructure was formed with high regularity of the narrow pores. It was also confirmed that the narrow pores extended up to the fine-hole terminating member and that the length of the narrow pores was controlled by placing the fine-hole terminating member.

Further, the workpiece after the Ni filling was observed with the FE-SEM and it was confirmed that the narrow pores were filled with Ni and the quantum wires of Ni were formed in the thickness of about 50 nm.

EXAMPLE 13

(a) Preparation of workpiece

As illustrated in FIG. 9A, the workpiece was prepared in the form of a mirror-polished workpiece by electrolytic polishing of the surface of the Al sheet with the purity of 99.99% in the mixed solution of perchloric acid and ethanol.

(b) Step of forming narrow-pore-formation starting points

With the focused ion beam irradiation apparatus the focused ion beam was radiated onto the workpiece to form the narrow-pore-formation starting points 2 on the workpiece as illustrated in FIG. 9B. Here the ion species of the focused ion beam irradiation apparatus was Ga and the acceleration voltage was 30 kV.

Figure 10A:
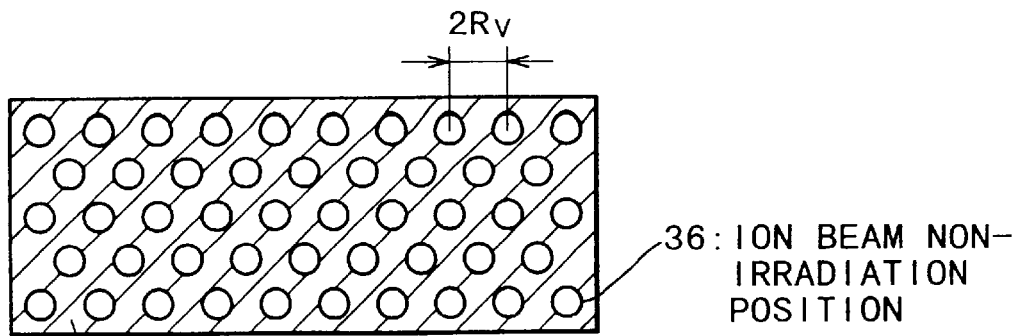
FIGS. 10A, 10B, 10C, and 10D are explanatory diagrams to show examples of the formation of the fine-hole-formation starting points by the particle beam irradiation according to the present invention.

First, the positions where the narrow-pore-formation starting points (recessed portions) were to be formed were defined using the secondary electron observing function attached to the focused ion beam irradiation apparatus. Then pyrene gas as a gas for formation of the surface layer was introduced into the focused ion beam irradiation apparatus. Further, using the focused ion beam having the ion beam diameter of about 30 nm and the ion current of about 3 pA, the narrow-pore-formation starting points (recessed portions) were formed by radiating the focused ion beam so that the positions not irradiated with the focused ion beam were the repetition of the approximately honeycomb pattern at the spacing of about 150 nm as illustrated in FIG. 10A. At this time the surface film containing C was formed at the positions irradiated with the focused ion beam.

(c) Step of forming narrow pores

Figure 9C:
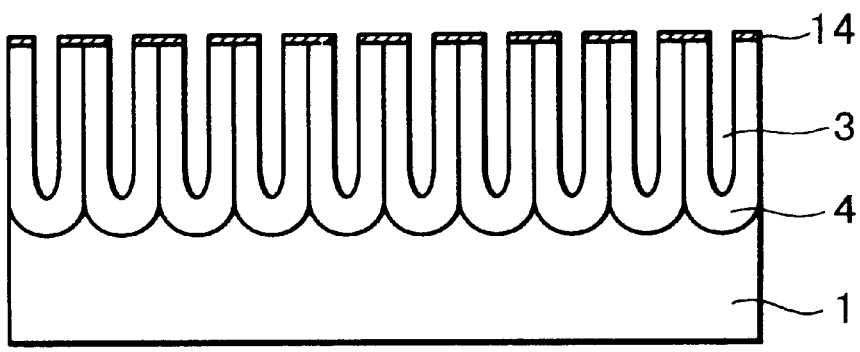

With the anodic oxidation apparatus of FIG. 5 the anodic oxidation operation was carried out on the workpiece to form the workpiece with narrow pores as illustrated in FIG. 9C. The acid electrolytic solution was a 0.3M phosphoric acid aqueous solution, the solution was kept at 3° C. by the thermostatic water bath, and the anodic oxidation voltage was approximately 70 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM (field emission scanning electron microscope) and it was confirmed that the diameter of the narrow pores was approximately 50 nm and the spacing of the narrow pores was approximately 150 nm, that the narrow pores were formed as the repetition of the approximately honeycomb pattern, and that the nanostructure was formed with high regularity of the narrow pores.

EXAMPLE 14

(a) Preparation of workpiece

As illustrated in FIG. 3B, the workpiece was prepared in the form in which the Al film 12 approximately 200 nm thick was formed on the quartz substrate 13 by resistance heating evaporation.

(b) Step of forming narrow-pore-formation starting points

With the focused ion beam irradiation apparatus the focused ion beam was radiated onto the workpiece to form the narrow-pore-formation starting points 2 on the workpiece as illustrated in FIG. 9B. Here the ion species of the focused ion beam irradiation apparatus was Ga and the acceleration voltage was 30 kV.

Figure 10B:
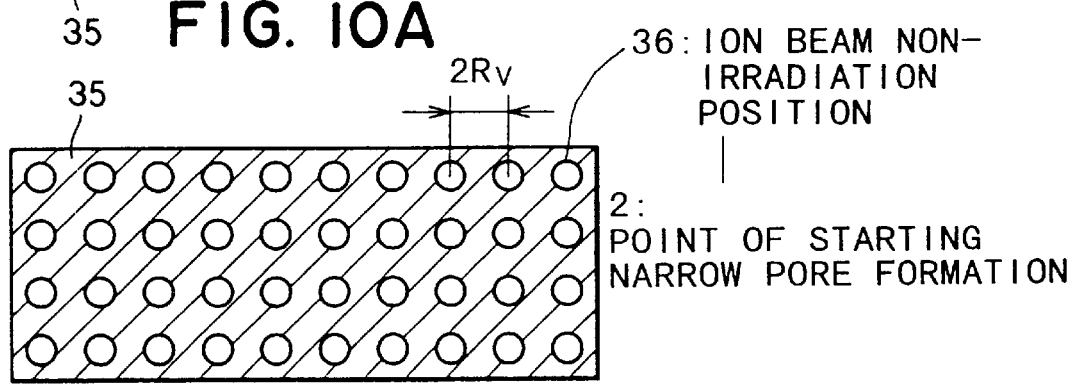

First, the positions where the narrow-pore-formation starting points (recessed portions) were to be formed were defined using the secondary electron observing function attached to the focused ion beam irradiation apparatus. Then the pyrene gas as a gas for formation of the surface layer was introduced into the focused ion beam irradiation apparatus. Further, using the focused ion beam having the ion beam diameter of about 30 nm and the ion current of about 3 pA, the narrow-pore-formation starting points (recessed portions) were formed by radiating the focused ion beam so that the positions not irradiated with the focused ion beam were the repetition of the approximately square pattern at the spacing of about 150 nm as illustrated in FIG. 10B. At this time the surface film containing C was formed at the positions irradiated with the focused ion beam.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was a 0.3M oxalic acid aqueous solution, the solution was kept at 3° C. by the thermostatic water bath, and the anodic oxidation voltage was approximately 60 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM and it was confirmed that the diameter of the narrow pores was approximately 50 nm and the spacing of the narrow pores was approximately 150 nm, that the narrow pores were formed as the repetition of the approximately square pattern, and that the nanostructure was formed with high regularity of the narrow pores.

EXAMPLE 15

(a) Preparation of workpiece

The workpiece was prepared in the form similar to that in Example 13.

(b) Step of forming narrow-pore-formation starting points

With the focused ion beam irradiation apparatus the focused ion beam was radiated onto the workpiece to form the narrow-pore-formation starting points 2 on the workpiece as illustrated in FIG. 9B. Here the ion species of the focused ion beam irradiation apparatus was Ga and the acceleration voltage was 30 kV.

Figure 10C:
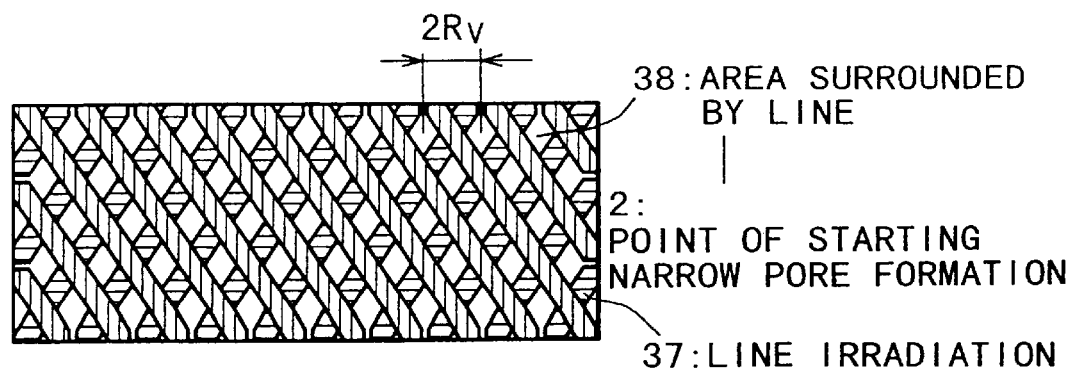
Figure 10D:
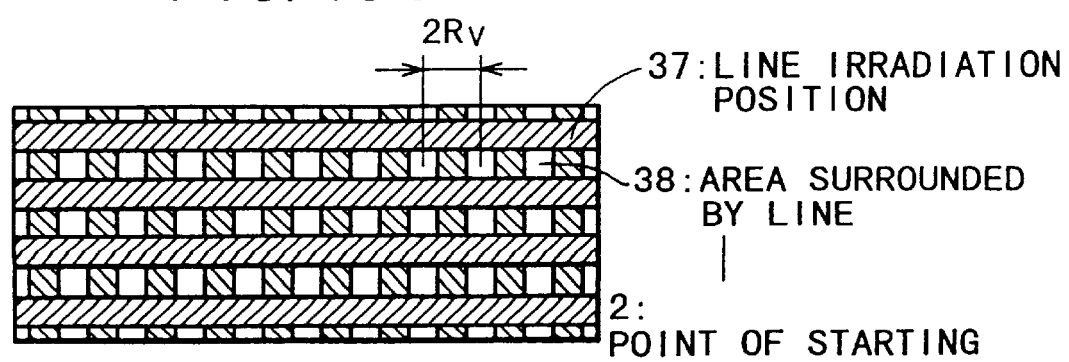

First, the positions where the narrow-pore-formation starting points (recessed portions) were to be formed were defined using the secondary electron observing function attached to the focused ion beam irradiation apparatus. Then W(CO)$_6$ gas as a gas for formation of the surface film was introduced into the focused ion beam irradiation apparatus. Then using the focused ion beam having the ion beam diameter of approximately 30 nm and the ion current of approximately 3 pA, the narrow-pore-formation starting points (recessed portions) were formed in the areas surrounded by lines in such a manner that the focused ion beam was radiated in a line pattern to implement the repetition of nearly parallel lines at the spacing of approximately 150 nm and then the focused ion beam was radiated in a line pattern so as to implement the repetition of nearly parallel lines at the spacing of approximately 150 nm in a direction inclined at 60° to the previous lines as illustrated in FIG. 10C. At this time the surface film containing W was formed at the positions irradiated with the focused ion beam.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was a 0.3M phosphoric acid aqueous solution, the solution was kept at 3° C. by the thermostatic water bath, and the anodic oxidation voltage was approximately 80 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM and it was confirmed that the diameter of the narrow pores was approximately 50 nm and the spacing of the narrow pores was approximately 170 nm, that the narrow pores were formed as the repetition of the approximately honeycomb pattern, and that the nanostructure was formed with high regularity of the narrow pores.

EXAMPLE 16

The present example is an example in which the nanostructure with through narrow pores was produced by removing the other portions than the portion having the narrow pores.

(a) Preparation of workpiece; and (b) step of forming narrow-pore-formation starting points By the methods similar to those in (a) and (b) of Example 13, the workpiece was prepared and thereafter the narrow-pore-formation starting points (recessed portions) were formed in the workpiece.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was a 0.3M oxalic acid aqueous solution, the solution was kept at 3° C. by the thermostatic water bath, and the anodic oxidation voltage was approximately 70 V.

(d) Step of removing the portions other than the one having the narrow pores

The step of removing the portions other than the one having the narrow pores is illustrated in FIGS. 6A to 6C.

First, the surface layer 14 was removed by Ar ion etching of the workpiece as illustrated in FIG. 9C (FIG. 6A). Then the workpiece was immersed in HgCl$_2$ saturated solution to remove the part of Al bulk 11 of the workpiece (FIG. 6B). Then the workpiece was immersed in 5 wt % phosphoric acid solution for 30 minutes to remove the barrier layer 4 and widen the diameter of the narrow pores, thereby producing the nanostructure having the through narrow pores 5 (FIG. 6C).

Evaluation (observation of structure)

The workpiece was observed with the FE-SEM and it was confirmed that the diameter of the narrow pores was approximately 50 nm and the spacing of the narrow pores was approximately 150 nm, that the through narrow pores were formed as the repetition of the approximately honeycomb pattern, and that the nanostructure was formed with high regularity of the through narrow pores.

EXAMPLE 17

The present example is an example in which the nanostructure (quantum wires) was produced by filling the metal in the narrow pores, using the nanostructure with the narrow pores formed by the anodic oxidation, as a mold.

(a) Preparation of workpiece

As illustrated in FIG. 7A, the workpiece 1 was prepared in such a manner that the substrate 13 was formed by depositing the Ti film, which will be used as a fine-hole terminating member approximately 50 nm thick, on the Si substrate 16 by sputtering and thereafter the Al film 12 approximately 500 nm thick was further deposited thereon by resistance heating evaporation.

(b) Step of forming narrow-pore-formation starting points

The narrow-pore-formation starting points (recessed portions) were formed in the workpiece by the method similar to that in (b) of Example 13.

(c) Step of forming narrow pores

By the method similar to that in (c) of Example 13, the narrow pores were formed in the workpiece and thereafter the diameter of the narrow pores was widened (FIG. 7B). It was confirmed here by decrease of current that the anodic oxidation proceeded up to the fine-hole terminating member during the anodic oxidation operation.

(d) Step of filling metal in the narrow pores

Then the Ni metal electrodeposition was carried out to fill the filler 6 in the narrow pores (FIG. 7C). The Ni filling was effected in such a manner that the workpiece, together with the opposed electrode of Ni, was immersed in the electrolytic solution of 0.14M $NiSO_4$ and 0.5M $H_3BO_3$ to bring about electrodeposition to precipitate Ni in the nanoholes.

Evaluation (observation of structure)

The workpiece before the Ni filling was observed with the FE-SEM and it was confirmed that the diameter of the narrow pores was approximately 50 nm and the spacing of the narrow pores was approximately 150 nm, that the narrow pores were formed as the repetition of the approximately honeycomb pattern, and that the nanostructure was formed with high regularity of the narrow pores. It was also confirmed that the narrow pores extended up to the fine-hole terminating member and the length of the narrow pores was controlled by placing the fine-hole terminating member.

Further, the workpiece after the Ni filling was observed with the FE-SEM and it was confirmed that the narrow pores were filled with Ni and the quantum wires of Ni were formed in the thickness of about 50 nm.

EXAMPLE 18

(a) Preparation of workpiece

As illustrated in FIG. 9A, the workpiece was prepared in the form of a mirror-polished workpiece by electrolytic polishing of the surface of the Al sheet with the purity of 99.99% in the mixed solution of perchloric acid and ethanol.

(b) Step of forming narrow-pore-formation starting points

With the electron beam irradiation apparatus the electron beam was radiated onto the workpiece to form the narrow-pore-formation starting points 2 on the workpiece as illustrated in FIG. 9B. Here the acceleration voltage of the electron beam irradiation apparatus was 200 kV.

First, the positions where the narrow-pore-formation starting points 2 were to be formed were defined using the secondary electron observing function attached to the electron beam irradiation apparatus. Then the pyrene gas as a gas for formation of the surface film was introduced into the electron beam irradiation apparatus. Further, using the electron beam having the beam diameter of about 10 nm, the narrow-pore-formation starting points (recessed portions) were formed by radiating the electron beam so that the positions not irradiated with the electron beam were the repetition of the approximately honeycomb pattern at the spacing of about 150 nm as illustrated in FIG. 10A. At this time the surface film containing C was formed at the positions irradiated with the electron beam.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was a 0.3M phosphoric acid aqueous solution, the solution was kept at 3° C. by the thermostatic water bath, and the anodic oxidation voltage was approximately 70 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM (field emission scanning electron microscope) and it was confirmed that the diameter of the narrow pores was approximately 50 nm and the spacing of the narrow pores was approximately 150 nm, that the narrow pores were formed as the repetition of the approximately honeycomb pattern, and that the nanostructure was formed with high regularity of the narrow pores.

EXAMPLE 19

(a) Preparation of workpiece

As illustrated in FIG. 9A, the workpiece was prepared in the form in which the Al film approximately 200 nm thick was formed on the quartz substrate by resistance heating evaporation.

(b) Step of forming narrow-pore-formation starting points

With the electron beam irradiation apparatus the electron beam was radiated onto the workpiece to form the narrow-pore-formation starting points 2 on the workpiece as illustrated in FIG. 9B. Here the acceleration voltage of the electron beam irradiation apparatus was 200 kV.

First, the positions where the narrow-pore-formation starting points (recessed portions) were to be formed were defined using the secondary electron observing function attached to the electron beam irradiation apparatus. Then the pyrene gas as a gas for formation of the surface film was introduced into the electron beam irradiation apparatus. Further, using the electron beam having the beam diameter of about 10 nm, the narrow-pore-formation starting points (recessed portions) were formed by radiating the electron beam so that the positions not irradiated with the electron beam were the repetition of the approximately square pattern at the spacing of about 150 nm as illustrated in FIG. 10B. At this time the surface film containing C was formed at the positions irradiated with the electron beam.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was a 0.3M oxalic acid aqueous solution, the solution was kept at 3° C. by the thermostatic water bath, and the anodic oxidation voltage was approximately 60 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM and it was confirmed that the diameter of the narrow pores was approximately 50 nm and the spacing of the narrow pores was approximately 150 nm, that the narrow pores were formed as the repetition of the approximately square pattern, and that the nanostructure was formed with high regularity of the narrow pores.

EXAMPLE 20

(a) Preparation of workpiece

The workpiece was prepared in the form similar to that in Example 18.

(b) Step of forming narrow-pore-formation starting points

With the electron beam irradiation apparatus the electron beam was radiated onto the workpiece to form the narrow-pore-formation starting points 2 on the workpiece as illustrated in FIG. 9B. Here the acceleration voltage of the electron beam irradiation apparatus was 200 kV.

First, the positions where the narrow-pore-formation starting points (recessed portions) were to be formed were defined using the secondary electron observing function attached to the electron beam irradiation apparatus. Then the $W(CO)_6$ gas as a gas for formation of the surface film was introduced into the electron beam irradiation apparatus. Then using the electron beam having the beam diameter of approximately 10 nm, the narrow-pore-formation starting points (recessed portions) were formed in the areas surrounded by lines in such a manner that the electron beam was radiated in a line pattern to implement the repetition of nearly parallel lines at the spacing of approximately 150 nm and then the electron beam was radiated in a line pattern to implement the repetition of nearly parallel lines at the spacing of approximately 150 nm in a direction inclined at 60° to the previous lines as illustrated in FIG. 10C. At this time the surface film containing W was formed at the positions irradiated with the electron beam.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was 0.3M phosphoric acid aqueous solution, the solution was kept at 3° C. by the thermostatic water bath, and the anodic oxidation voltage was approximately 80 V.

After the anodic oxidation operation, the workpiece was then immersed in 5 wt % phosphoric acid solution for 30 minutes to widen the diameter of the narrow pores.

Evaluation (observation of structure)

The workpiece was observed with the FE-SEM and it was confirmed that the diameter of the narrow pores was approximately 50 nm and the spacing of the narrow pores was approximately 170 nm, that the narrow pores were formed as the repetition of the approximately honeycomb pattern, and that the nanostructure was formed with high regularity of the narrow pores.

EXAMPLE 21

The present example is an example in which the nanostructure with through narrow pores was produced by removing the other portions than the portion having the narrow pores.

(a) Preparation of workpiece; and (b) step of forming narrow-pore-formation starting points By the methods similar to those in (a) and (b) of Example 18, the workpiece was prepared and thereafter the narrow-pore-formation starting points (recessed portions) were formed in the workpiece.

(c) Step of forming narrow pores

With the anodic oxidation apparatus of FIG. 5 the anodic oxidation operation was carried out on the workpiece to form the workpiece with narrow pores as illustrated in FIG. 9C. The acid electrolytic solution was a 0.3M oxalic acid aqueous solution, the solution was kept at 3° C. by the thermostatic water bath, and the anodic oxidation voltage was approximately 70 V.

(d) Step of removing the portions other than the one having the narrow pores

The step of removing the portions other than the one having the narrow pores is illustrated in FIGS. 6A to 6C.

First, the surface film 14 was removed by Ar ion etching of the workpiece as illustrated in FIG. 9C (FIG. 6A). Then the surface film was immersed in the $HgCl_2$ saturated solution to remove the part of Al bulk 11 of the workpiece (FIG. 6B). Then the workpiece was immersed in 5 wt % phosphoric acid solution for 30 minutes to remove the barrier layer 4 and widen the diameter of the narrow pores, thereby producing the nanostructure having the through narrow pores 5 (FIG. 6C).

Evaluation (observation of structure)

The workpiece was observed with the FE-SEM and it was confirmed that the diameter of the narrow pores was approximately 50 nm and the spacing of the narrow pores was approximately 150 nm, that the through narrow pores were formed as the repetition of the approximately honeycomb pattern, and that the nanostructure was formed with high regularity of the through narrow pores.

EXAMPLE 22

The present example is an example in which the nanostructure (quantum wires) was produced by filling the metal in the narrow pores, using the nanostructure with the narrow pores formed by the anodic oxidation, as a mold.

(a) Preparation of workpiece

As illustrated in FIG. 7A, the workpiece 1 was prepared in such a manner that the substrate 13 was formed by depositing the Ti film, which will be used as a fine-hole terminating member approximately 50 nm thick, on the Si substrate 16 by sputtering and thereafter the Al film 12 approximately 500 nm thick was further deposited thereon by resistance heating evaporation.

(b) Step of forming narrow-pore-formation starting points

The narrow-pore-formation starting points (recessed portions) were formed in the workpiece by the method similar to that in (b) of Example 18.

(c) Step of forming narrow pores

By the method similar to that in (c) of Example 18, the narrow pores were formed in the workpiece and thereafter the diameter of the narrow pores was widened (FIG. 7B). It was confirmed here by decrease of current that the anodic oxidation proceeded up to the fine-hole terminating member during the anodic oxidation operation.

(d) Step of filling metal in the narrow pores

Then Ni metal electrodeposition was carried out to fill the filler 6 in the narrow pores (FIG. 7C). The Ni filling was effected in such a manner that the workpiece, together with the opposed electrode of Ni, was immersed in the electrolytic solution of 0.14M $NiSO_4$ and 0.5M $HBO_3$ to bring about electrodeposition to precipitate Ni in the nanoholes.

Evaluation (observation of structure)

The workpiece before the Ni filling was observed with the FE-SEM and it was confirmed that the diameter of the narrow pores was approximately 50 nm and the spacing of the narrow pores was approximately 150 nm, that the narrow pores were formed as the repetition of the approximately honeycomb pattern, and that the nanostructure was formed with high regularity of the narrow pores. It was also confirmed that the narrow pores extended up to the fine-hole terminating member and the length of the narrow pores was controlled by placing the fine-hole terminating member.

Further, the workpiece after the Ni filling was observed with the FE-SEM and it was confirmed that the narrow pores were filled with Ni and the quantum wires of Ni were formed in the thickness of about 50 nm.

As described above, the present invention presents the following effects.

(1) The narrow pores can be formed with controlling the arrangement, spacing, position, direction, etc. of the narrow pores and the narrow pores and the structure with narrow pores (anodized alumina) can be produced with regularly ordered narrow pores excellent in linearity.

(2) Since the particle beam irradiation is employed for the formation of the narrow-pore-formation starting points (recessed portions), the narrow-pore-formation starting points (recessed portions) can also be formed with high uniformity even on the workpiece with unevenness in the surface.

(3) Since the particle beam irradiation is employed for the formation of the narrow-pore-formation starting points (recessed portions), no pressure has to be exerted on the workpiece during the formation of the narrow-pore-formation starting points (recessed portions) and thus the present invention can also be applied to the workpieces of low mechanical strength.

(4) In cases wherein the film is formed in the surface of the workpiece, the narrow-pore-formation starting points (recessed portions) can also be formed by radiating the particle beam onto the film to remove a part of the film.

What is claimed is:

1. A method for producing a narrow pore, said method comprising:
   a step of preparing a workpiece containing Al as a principal component;
   a step of selectively radiating a focused particle beam onto a surface of said workpiece; and
   a step of carrying out anodic oxidation of the workpiece having been irradiated with the focused particle beam, to form a narrow pore in the workpiece.

2. The method according to claim 1, wherein said particle beam is a charged particle beam.

3. The method according to claim 2, wherein said particle beam is an ion beam or an electron beam.

4. The method according to claim 2, wherein an element of ion species used for said focused ion beam is an element except for the noble metals.

5. The method according to claim 4, wherein the element of ion species used for said focused ion beam is implanted in a concentration not less than 1 ppm in said workpiece.

6. The method according to claim 1, wherein said particle beam is radiated onto a plurality of portions on the workpiece.

7. The method according to claim 1, wherein said particle beam is radiated plural times onto one portion of said workpiece.

8. The method according to claim 1, wherein said particle beam is radiated in different doses of the particle beam radiated, depending upon irradiated positions on said workpiece.

9. The method according to claim 1, wherein said step of radiating the particle beam is a step of selectively forming a film for restraining the anodic oxidation, on a surface of said workpiece from a raw material present in an atmosphere surrounding said workpiece.

10. The method according to claim 9, wherein said film for restraining the anodic oxidation is an insulator.

11. The method according to claim 9, wherein said film for restraining the anodic oxidation is a film containing Nb, Ti, Ta, Zr, W, Hf or C.

12. The method according to claim 9, wherein said film for restraining the anodic oxidation comprises an insulator film and an electroconductive film formed thereon.

13. The method according to claim 9, wherein the raw material present in the atmosphere surrounding said workpiece is a metal hydride, a metal halide, or an organic compound.

14. The method according to claim 13, wherein said organic compound is an organic metal compound.

15. The method according to claim 1, wherein a diameter of the particle beam radiated onto said workpiece is not more than 500 nm.

16. A structure with a narrow pore produced by the method as set forth in any one of claims 1 to 5, 13 and 14.

* * * * *